US012198544B2

(12) United States Patent
Nguyen

(10) Patent No.: US 12,198,544 B2
(45) Date of Patent: Jan. 14, 2025

(54) PROBABILISTICALLY ADAPTIVE TRAFFIC MANAGEMENT SYSTEM

(71) Applicant: ThruGreen, LLC, Falls Church, VA (US)

(72) Inventor: David H. Nguyen, Southbridge, VA (US)

(73) Assignee: THRUGREEN, LLC, Falls Church, VA (US)

( * ) Notice: Subject to any disclaimer, the term of this patent is extended or adjusted under 35 U.S.C. 154(b) by 0 days.

(21) Appl. No.: 18/249,795

(22) PCT Filed: Oct. 20, 2020

(86) PCT No.: PCT/US2020/046496
§ 371 (c)(1),
(2) Date: Apr. 20, 2023

(87) PCT Pub. No.: WO2022/086482
PCT Pub. Date: Apr. 28, 2022

(65) Prior Publication Data

US 2023/0386330 A1 Nov. 30, 2023

(51) Int. Cl.
*G08G 1/07* (2006.01)
*G08G 1/01* (2006.01)
*G08G 1/056* (2006.01)
*G08G 1/08* (2006.01)

(52) U.S. Cl.
CPC ............ *G08G 1/08* (2013.01); *G08G 1/0112* (2013.01); *G08G 1/0129* (2013.01); *G08G 1/0145* (2013.01); *G08G 1/056* (2013.01)

(58) Field of Classification Search
USPC ....... 340/920, 924, 925, 929, 944, 931, 973, 340/982, 991–994, 995.13, 641, 661, 340/825.49
See application file for complete search history.

(56) References Cited

U.S. PATENT DOCUMENTS 8,209,160 B2 * 6/2012 Kreitzer ................. G06F 30/00 703/13
10,121,370 B2 11/2018 Elsheemy
10,743,198 B1 8/2020 Park
2007/0208497 A1 * 9/2007 Downs ................ G08G 1/0104 701/117
2012/0003268 A1 1/2012 Nandi et al.
(Continued)

OTHER PUBLICATIONS

Noah J. Goodall, "Traffic Signal Control with Connected Vehicles", A Dissertation Presented to the Faculty of the School of Engineering and Applied Science University of Virginia, May 1, 2013 (May 1, 2013), pp. 1-224, US.
(Continued)

*Primary Examiner* — Daniel Previl
(74) *Attorney, Agent, or Firm* — Laubscher & Fretwll, P.C.

(57) ABSTRACT

The system includes circuitry to send and/or receive data, a processor to process data, memory for storing data to operate a traffic control algorithm. The system is configured to transmit processed data to traffic control devices. The traffic control algorithm includes at least one step of calculating and estimating total probabilities of future traffic locations and time periods, and selecting an action for the traffic control devices to perform during those time periods.

2 Claims, 13 Drawing Sheets

(56) References Cited

U.S. PATENT DOCUMENTS

| | | | | |
|---|---|---|---|---|
| 2017/0337813 | A1* | 11/2017 | Taylor | G05D 1/0285 |
| 2018/0001744 | A1 | 1/2018 | Vehr et al. | |
| 2018/0174449 | A1 | 6/2018 | Nguyen | |
| 2018/0261085 | A1* | 9/2018 | Liu | G08G 1/08 |
| 2019/0272747 | A1 | 9/2019 | Raamot | |
| 2021/0389426 | A1* | 12/2021 | Millischer | G01S 7/486 |
| 2022/0046114 | A1* | 2/2022 | Entelis | H04L 12/40 |

OTHER PUBLICATIONS

Xiaoyuan Liang et al., “Deep Reinforcement Learning for Traffic Light Control in Vehicular Networks”, Mar. 29, 2018 (Mar. 29, 2018), whole document, US.

* cited by examiner

PROBABILISTICALLY ADAPTIVE TRAFFIC MANAGEMENT SYSTEM

This application claims benefit of U.S. provisional patent application No. 62/922,517 filed on Aug. 15, 2019, the contents of which are incorporated by reference herein in their entirety. The contents of international patent application No. PCT/US17/67350 filed on Dec. 19, 2017 and international patent application No. PCT/US19/28440 filed on Apr. 22, 2019 are also incorporated by reference herein in their entirety.

BACKGROUND

Field of the Disclosure

The present disclosure is directed to a probabilistically adaptive traffic management system and method.

Description of the Related Art

Vehicle traffic congestion is a major problem worldwide with costs estimated in the hundreds of billions of dollars per year in the United States alone. While there are many causes of traffic congestion, some of the major causes include vehicle counts exceeding road capacity for given conditions, unpredictable human drivers, many of whom are distracted, accidents, and timed traffic signals that further limit road capacity at signalized junctions (intersections).

Congestion can arise in cases where more vehicles are waiting in a queue at a junction for a traffic signal to change from displaying a red light to displaying a green light, and the period the traffic signal is green does not allow all the vehicles waiting in the queue to pass through the junction. Another case where congestion may arise in a similar scenario is if the traffic signal does remain green to otherwise clear the waiting queue of vehicles but a road ahead of the queue of vehicles is congested with other vehicles, the queue of vehicles still cannot proceed through the junction.

Further, while highways and interstate freeways are not typically signalized, traffic congestion on those thoroughfares can also have a significant impact on transportation and quality of life in general.

SUMMARY

The present disclosure is directed to a system for probabilistically and adaptively controlling traffic control devices. The system includes circuitry to send and/or receive data, a processor to process data, memory for storing data to operate a traffic control algorithm. The system is configured to transmit processed data to traffic control devices. The traffic control algorithm includes at least one step of calculating and estimating total probabilities of future traffic locations and time periods, and selecting an action for the traffic control devices to perform during those time periods.

The foregoing general description of the illustrative implementations and the following detailed description thereof are merely exemplary aspects of the teachings of this disclosure, and are not restrictive.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein.

DETAILED DESCRIPTION OF THE EMBODIMENTS

Figure 1:
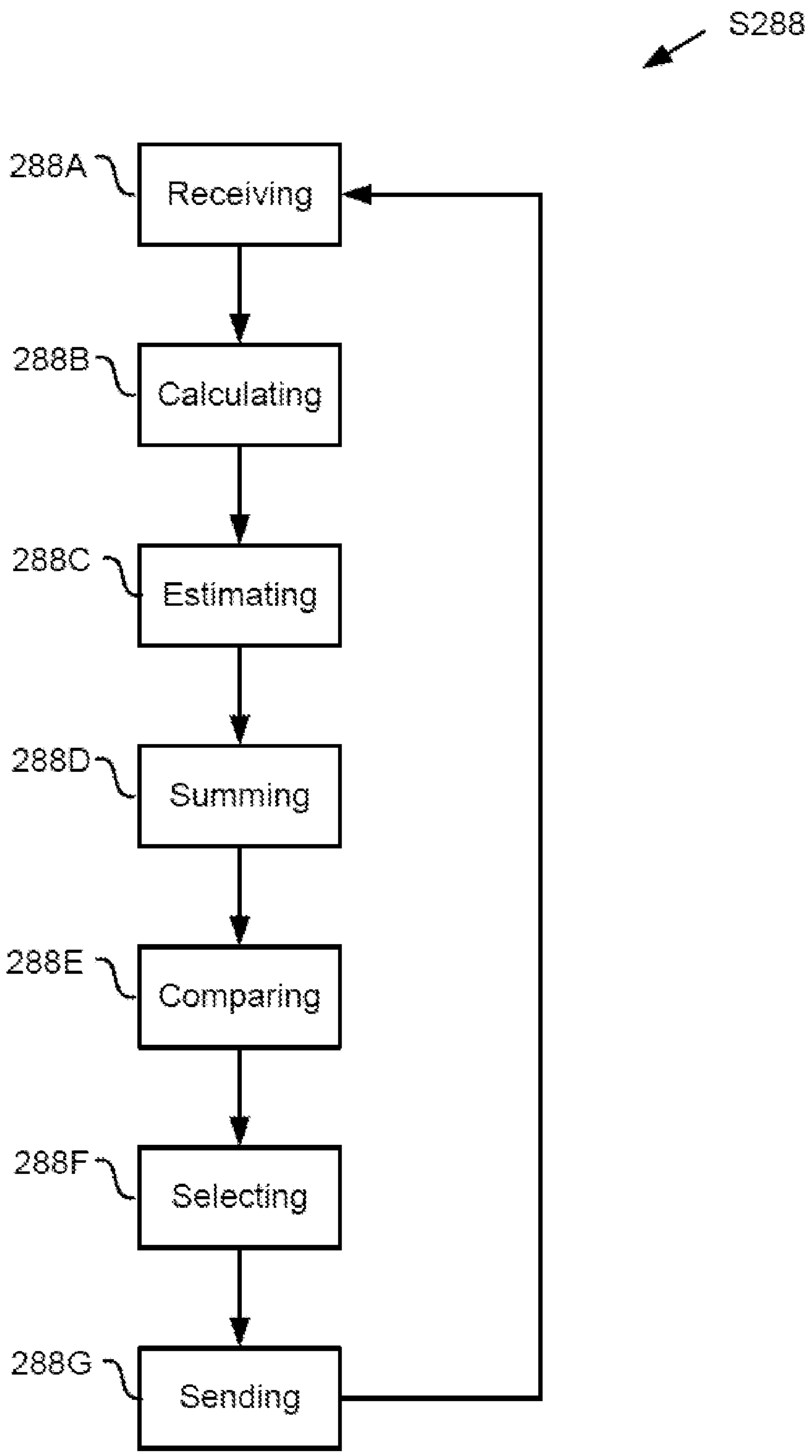
FIG. 1 is a diagram for an adaptive traffic control process S288 for controlling traffic signals and other traffic control devices, according to one example.

In the drawings, like reference numerals designate identical or corresponding parts throughout the several views. Further, as used herein, the words “a”, “an” and the like generally carry the meaning of “one or more”, unless stated otherwise. Referring now to the drawings, wherein like reference numerals designate identical or corresponding parts throughout the several views.

A traffic control system may operate one or more traffic control devices, such as a traffic signal controller (TSC), a traffic signal, a dynamic message sign, or a gate, or provide an output signal to another device or system, based on a traffic control process. The traffic control system may obtain traffic detection information from sensors at fixed locations, mobile sensors, or other data sources. The traffic control process may provide an output signal or command to the traffic control system based on processing traffic detection information from one or more sources.

The traffic control process may use data processing to determine an expected value (EV) of traffic demand at one or more locations during a time horizon extending from a present time to a future time. The time horizon may include one or more time periods.

Each detected or known user, such as a vehicle, a mobile device, a pedestrian, an autonomous vehicle, a drone, or a bicyclist may be considered by the traffic control process. One way the traffic control process may account for a user is to assign an EV to the user during one or more time periods of the time horizon with respect to one or more locations.

Each EV may represent traffic demand from the user, such as a probability the user will be at a particular location during a time period. The user’s EV with respect to a future location may depend, at least in part, on a present or previous location, a heading, and a speed of the user. The corresponding time period of each EV of the user may depend, at least in part, on an estimated speed of the user between the user’s present location and the future location(s).

During a time period, a total directional demand for a direction of a location, such as a first direction approaching a junction, may be determined from the EV of more than one user expected to be approaching the location from the first direction. For example, the total EV of the first direction of the junction may be a sum or a product of the EV of one or more of the users approaching the junction from the first direction during the time period(s) contemplated.

Each source providing data to the traffic control process may have a weighting reflecting relative importance of or confidence in the source’s data output compared with those of a second source, as each data source or gathering technique may model actual events with varying degrees of granularity or resolution.

The EV assigned to each user that is detected and considered may be weighted differently based on whether the user may be identifiable or identified again. Users that are identifiable may have a higher weighting than users that are merely detected and not otherwise identifiable. This is because the traffic control system may have additional data about identifiable users that may allow the traffic control process to assign EVs for a user to upcoming time periods of the time horizon with a greater degree of confidence or accuracy than if the user is not identifiable.

Based on directional demand of one or more directions approaching the location, the traffic control process may select an action or set of actions for one or more traffic control devices to operate during one or more upcoming time periods. For example, the traffic control process may select a signal phase and timing (SPaT) plan for operating one or more traffic signals at a junction, selecting a message to display on a dynamic message sign, deciding whether to open or close a gate, or providing an output signal to another device or system, such as to a mobile device, a computer system or network, or to a vehicle’s communication system.

Vehicle detection data may be obtained from a variety of sources and calculation of expected value (EV) and time periods may occur in a variety of ways. EV may be used to denote a variety of measures or indicators of a traffic volume, such as VSS, GSS, vehicle count, lane or road occupancy. Further, the terms signal, signal status, red light, green light, red signal, and green signal may be used within to describe a traffic signal or a status of a traffic signal, and the terms vehicle and user may at times be used interchangeably herein.

For purposes of traffic management and real-time adaptive traffic signal timing, more data and greater precision of such data may allow optimal signal timing adaptation by the TMS 101 or other traffic control systems or devices. The more data and the closer to real-time that data may be obtained, the sooner the TMS 101 may act upon it, and the more precise and accurate the results may be. Availability of historical data and past actions of a specific vehicle or a user may provide more precise and accurate calculation of EVs and time periods of arrivals for the vehicle or user relative to certain locations compared with anonymous vehicle or user detection data where history of the vehicle or user is not known. Fewer assumptions may need to be made compared with situations where less data and less precise data types are available.

A junction may be an intersection of two paths, for example, an intersection of two or more roads such as the junction A2, an intersection of a road and a pedestrian path, an intersection between a road and a driveway, or a location and heading that presents more than one defined path or action (e.g. stop or go) for a vehicle or user. Aside from possible junctions, a path or road segment may also include locations where events or changes in probabilities may occur between a present time and a future time.

For example, an available parking location may result in a vehicle R1 stopping to park and not proceeding to a next junction during a present time horizon TH.

In another example, a crossing on a road segment may result in the vehicle R1 stopping to allow cross traffic movement, such as a pedestrian, bicyclist, rail vehicle, or other vehicle to proceed. Detection locations may include locations approaching or entering a junction, locations at or near a junction exit, or locations located in between junctions, and that are not an approach or exit of a junction and may be referred to as “mid-block”.

Aggregate historical data may represent a composite of activity from one or more users over a period of time, such as from multiple vehicles traveling on a road segment. Aggregate data may include measures or indicators such as average travel time, average speed, vehicle counts, road or lane occupancy, rates of lane changes, rates of acceleration or deceleration, rates of yaw or pitch, and other indicators of traffic volume, density, congestion, trends, and/or speed on a road segment during a period of time.

Such data may be used to adjust calculations such as estimated or assumed average speeds or travel times on one or more road segments, helping to inform the TMS 101 how and when to adjust a traffic signal at a junction to more accurately accommodate (or stop) directions with traffic, or to identify locations with stops or delays.

Vehicle traffic known or estimated to be traveling in a particular direction may be detected at a location. Vehicle detection data may be obtained from a fixed sensor. Fixed sensors may include, for example, an inductive loop embedded in pavement, a video camera, a thermal camera, an automatic license plate reader (ALPR), a radar, microwave, lidar, or ultrasonic detection device, a pressure sensor, an acoustic sensor, or a Bluetooth sensor (BTS) for detecting vehicle presence or identity (e.g. via a Media Access Control (MAC) address).

A fixed sensor may detect traffic stopped or passing by within the sensor's range of detection. The sensor output may be a digital output (e.g. binary one or zero), a digital image or signature, output of local processing of sensor-related data, or a voltage signal, such as for a contact closure switch. Once a vehicle or user is detected at a location, the TMS 101 may then estimate an expected value for at least one possible subsequent location of the vehicle or user.

In one case, if the vehicle R1 is detected at a second location D2, and the second location D2 is an entrance to the junction A2, the expected value EVA2 of the vehicle R1 with respect to the junction A2 may approach a value of one because the vehicle R1 has already arrived at an entrance of the junction A2.

In one case, if the vehicle R1 is detected at the first location D1 but cannot be specifically identified (e.g. the vehicle's ID and history is unknown) as is the case with some fixed sensors used for traffic detection, then estimation of arrival of the vehicle R1 at a subsequent location may be accomplished by calculating an expected value EV and an estimated travel time tETA for the vehicle R1 for a possible subsequent location, such as the second location D2, based on available information at the first location D1. Such values may also be assigned or determined on the basis of past traffic information.

In another case, if the vehicle R1 is detected at the first location D1 and may be specifically identified, such as in a case with some fixed sensors used for traffic detection, and may be identified again at the second location D2, then estimation of arrival of the vehicle R1 at a possible subsequent location may be accomplished by calculating at or after the first location D1 the expected value EV and the estimated travel time tETA for the possible subsequent location as previously described. Such sensors may include, for example, a BTS to identify a MAC address, an ALPR, a toll tag, or a camera with image recognition capability and able to identify one or more defining characteristics of a vehicle or user (e.g. vehicle type, color, number of passengers, facial recognition, etc.).

However, if the vehicle R1 may be detected and specifically identified again at a subsequent location, such as the second location D2, then the expected value EV and the estimated travel time tETA of the vehicle R1 relative to one or more locations, such as for a third location, may be updated after the vehicle R1 is detected at the second location D2.

The closer the first location D1 and the second location D2 are to each other in terms of distance and/or travel time, and the more frequent detection and possible identification of the vehicle R1 may occur, the greater a resolution of information may be obtained about the movement of the vehicle R1.

Mobile sensor data may be obtained from a mobile device such as a phone, a tablet computer, an on-board vehicle computer (e.g. OBD-II), a device built into or connected to a vehicle (truck, bus, automobile, motorcycle, bicycle, scooter, etc.) that may transmit a present location, such as latitude/longitudinal coordinates of the vehicle, or from which a present location or other information (e.g. speed, heading, vehicle status, etc.) may be obtained.

If an intended route or action of the vehicle R1 is known, the TMS 101 may adjust the expected value EV of the vehicle R1 relative to one or more locations. The vehicle R1 may then have a set of EVs with respect to possible subsequent locations that has a greater degree of confidence and resolution than may be estimated from information based on aggregate traffic information.

Analogously for pedestrians, if an intended path or route of a pedestrian P1 is known, then the TMS 101 may adjust the EV of the user P1 relative to one or more locations. The pedestrian P1 may then have a set of EVs with respect to possible subsequent locations that has a much a greater degree of confidence and resolution than may be estimated from information based on that from fixed sensors or from aggregate pedestrian information.

Further, communication may occur that is unidirectional from the vehicle R1 or pedestrian P1 to the TMS 101 (and the TMS 101 may not be able to communicate updates directly to the vehicle R1 or the pedestrian P1) or bidirectional between the TMS 101 and the vehicle R1 or the pedestrian P1.

In some cases, two or more of the aforementioned detection techniques may be used to identify a vehicle at a first and a second location, such as by identifying a first detection at a first location using a first detection process, identifying a second detection at a second detection using a second detection process, and using a database to relate the first and the second detection events to one vehicle and/or user identity.

In one case, a BTS may detect a MAC address that may be cross referenced with a license plate detected by an ALPR. In another case, a toll tag in a vehicle may be cross referenced with a license plate detected by an ALPR. In another case, a toll tag in a vehicle may be cross referenced with a MAC address detected by a BTS. In another case, a driver may be identified by a facial recognition system and cross referenced with a known or detected mobile device MAC address.

Associating two or more detection events using one or more detection processes between a first and a second time instance may allow identification of the vehicle R1 path between the time instances.

Figure 2:
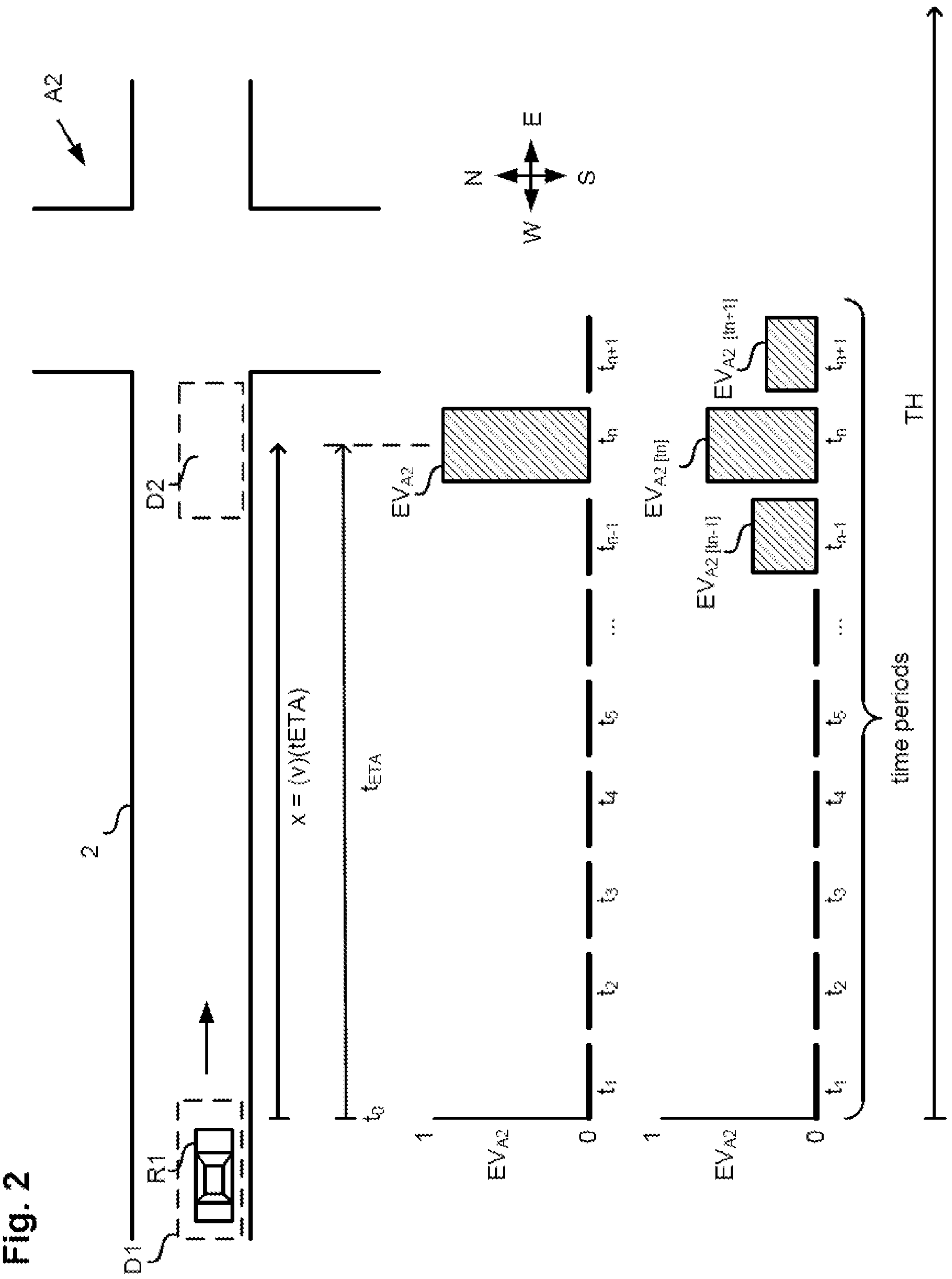
FIG. 2 is a diagram of a road segment 2 having a first location D1 and a second location D2 leading to a junction A2, according to one example.

FIG. 1 is a diagram for an adaptive traffic control process S288 for controlling traffic signals and other traffic control devices, according to one example. The process S288 for adaptive traffic control may be performed within or by the TMS 101, a subsystem or component of the TMS 101, or by another entity connected to the TMS 101, and may include at least one of the steps of:

Receiving 288A a traffic detection event of a user, such as the vehicle R1, at a first location, such as the location D1 or the junction A2 as shown in FIG. 2. The process may also include receiving information about more than one location, or information about a direction of travel, a speed, or other information about a status, characteristic, or action of the user.

Calculating 288B an expected value (EV) and a direction of travel of the user relative to one or more subsequent locations, such as the location D2, the junction A2, the location D3, and/or the junction B2. EVs may be determined in a variety of ways described further herein.

Estimating 288C a time of arrival that the user may arrive at the subsequent location during one or more future time periods, such as from time period t1 to time period tn.

Summing 288D the EV of all the users detected in each direction of travel approaching the location over for the future time periods.

Comparing 288E the total summed EV for each direction of travel approaching the location to determine an optimal strategy to execute for one or more future time periods. This may include prioritizing a direction having a greatest sum of EV during the future time periods. This may also include a process of iterating to determine EVs for a range of future time periods as part of an optimization process.

Selecting 288F an action, such as a signal timing plan, displaying a message, or operating a gate, to be performed by one or more traffic control devices during the range of future time periods in response to the comparing step.

Sending 288G the request to the traffic control device, such as transmitting the request from a processor in a cloud environment, a remote environment, or from a local processor and through to the TSC to correspondingly actuate the traffic signals.

FIG. 2 is a diagram of a road segment 2 having a first location D1 and a second location D2 leading to a junction A2, according to one example. A vehicle R1 may be traveling in an eastbound direction from the first location D1 toward the second location D2. In one case, the vehicle R1 may have an expected value EVA2 of arriving at the second location D2 during a time period tn. In another case, the vehicle R1 may have an expected value EVA2 of arriving at the second location D2 distributed over time periods tn−1, tn and tn+1. In both cases, a sum of durations of time periods from a present time period to expected time periods the vehicle R1 may arrive at the second location D2 (e.g. sum of t0 to tn or tn+1) may be equal to no more than a horizon TH.

The second location D2 may be located approximately at or adjacent to the junction A2, and may serve as an entrance to the junction A2 relative to a present location of the vehicle R1.

As the vehicle enters the junction A2, a probable action is that it may turn left and head north, go straight through and continue heading east, or turn right and head south. The vehicle R1 may have an EV relative to a location, such as the second location D2 and/or the junction A2, based on the present location and direction of the vehicle R1, such as the first location D1 and headed eastbound.

An EV may represent a probability of arrival of the vehicle R1 at a location. For example, an expected value EVA2 may represent a probability of arrival of the vehicle R1 at the junction A2 based on a present location, direction and any known information about general conditions or conditions related to the vehicle R1.

In a case the road segment 2 does not have additional turns or probable event factors between locations, such as junctions, parking or turning locations, the expected value EVA2 of the vehicle R1 may be estimated or calculated to have a high probability of eventual arrival at a next junction (within the time series t1 to tn), such as the second location D2, because low probability events are limited to those such as U-turns, collisions, breakdowns, and other relatively unexpected events.

In a case there are additional turns or probable event factors between locations, the expected value EVA2 of the vehicle R1 may be estimated or calculated to have a somewhat lower probability of eventual arrival at a next junction within the time series t1 to tn because certain possible events are more likely than in the previous case, such as the vehicle R1 stopping or turning prior to arrival at the second location D2.

In one case, the vehicle R1 may be detected to be traveling on the road segment 2 and traveling in a direction toward the junction A2 but not otherwise identified. The vehicle R1 may then be counted as traffic, and its expected value EVA2 relative to the junction A2 may be added to a total EV of all detected or estimated vehicles approaching the junction A2.

The expected value EVA2 for that detection event for the vehicle R1 may be assigned based partly or solely on general traffic data for the location.

It may be that no further adjustment to expected value EVA2 for the specific vehicle R1 is made since it may not be identified, so that particular vehicle R1 may not be detected and related again at a later time or location to the present detection, and the situation may be considered open loop.

In another case, the vehicle R1 may be detected to be traveling on the road segment 2 and traveling in the direction toward the junction A2, and the vehicle R1 is identified. The expected value EVA2 may be assigned based partly or solely on past traffic data of general traffic with respect to the location.

Alternatively, the expected value EVA2 may be assigned based partly or solely on past traffic data of that particular vehicle R1 with respect to the location and/or heading.

Further adjustment to EVA2 for the specific vehicle R1 may be made since that particular vehicle R1 may be detected and related again at a later time or location relative to the present detection.

In another case, the vehicle R1 may be detected to be traveling on the road segment 2 and traveling in the direction toward the junction A2, and an intended route of the vehicle R1 may be known. The expected value EVA2 may be assigned based partly or solely on the intended route of the vehicle R1 with respect to the location and/or heading.

Further adjustment to expected value EVA2 for the specific vehicle R1 may be made since the particular vehicle R1 may be detected and related again at a later time or location relative to the present or a previous detection, and with respect to the intended route.

Further, in any of the aforementioned cases the vehicle R1 may have an EV with respect to more than one location concurrently.

In a case there are no turns (such as junctions, parking lots, driveways, etc.) and stopping points (such as parking spaces) located between the present location of the vehicle R1, such as the first location D1, and the second location D2 then there exists a relatively high probability the vehicle R1 will arrive at the second location D2, and the expected value EVA2 of the vehicle R1 with respect to the junction A2 may approach one (100%).

In a case there are turns or stopping points located between the present location of the vehicle R1 and the second location D2 then the probability the vehicle R1 will arrive at the second location D2 may be lower, and the expected value EVA2 of the vehicle R1 with respect to the junction A2 may be somewhat less than one (100%).

In either case, the expected value EVA2 of the vehicle R1 with respect to the junction A2 may change as a location of the vehicle R1 changes.

An estimated travel time tETA between a present location of the vehicle R1, such as the first location D1, and a possible future location, such as the second location D2, may be estimated.

In one case, the travel time tETA may be estimated as tETA=x/v where x is an approximate distance between the first location D1 and the second location D2, and v is an estimated average speed or velocity of the vehicle R1, derived from a speed limit or target speed, or based on a present or historical travel time of one or more vehicles or users, such as that of the vehicle R1.

In another case, the travel time tETA may be based on a preset value or range of values, or derived from what may be considered present data and a range of average speeds or travel times. For example, these may be values occurring and collected within a previous hour, a previous 15 minutes, or a shorter period.

In another case, the travel time tETA may be based on a preset value or range of values, or derived from historical data and a range of average speeds or travel times. For example, these may be values occurring and collected over a period of more than the previous hour.

A series of consecutive time periods t1 to at least a time period tn may be defined from a present moment to encompass at least the estimated travel time tETA in which the vehicle R1 is anticipated to arrive at a location, such as the second location D2, with the end of the estimated travel time tETA period occurring during a time period tn.

Further, if a time period, for example the time period tn+1, extends beyond a present system time horizon TH for consideration, the TMS 101 may be configured to ignore the time period tn+1 until enough time has elapsed that the time period tn+1 is within the system time horizon TH before including an EV of the time period tn+1 in calculations relative to the second location D2.

An EV may be associated with each time period with respect to a particular location. The EV may represent a present probability of the location of the vehicle R1 during each time period, the present probability based at least in part on a present direction of travel, a present location of the vehicle R1, possible turns or stopping points en route, and/or any known information about general conditions or conditions related to the vehicle R1.

In one case, the vehicle R1 may have an EVA2 with respect to the junction A2 during a particular time period tn. Further, for each time period in the series of time periods t1 to at least tn, the vehicle R1 may have an expected value (e.g. EVA2[t1] to at least EVA2[tn]) with respect to the junction A2.

If the vehicle R1 has an estimated 95% probability (0.95) of arriving at the second location D2 and entering the junction A2 then EVA2 may equal 0.95.

Further, if arrival of the vehicle R1 is expected to occur during the time period tn then EVA2[tn] may equal 0.95 for the vehicle R1, while EV of other time periods for the vehicle R1 before or after the time period tn, such as EVA2[t1] to EVA2[tn−1] and any EVA2[tn+1] and beyond, may be equal to zero.

In the event the estimated travel time tETA of the vehicle R1 to a location increases, such as if average speed of the vehicle R1 to the junction A2 decreases, the vehicle R1 may have a higher likelihood of arriving at the junction A2 during a time period after the time period tn, such as during a time period tn+1 or tn+2 and so forth, and the expected value EVA2 may correspondingly shift to such a time period after the time period tn.

Conversely, if the estimated travel time tETA of the vehicle R1 to a location decreases, such as if average speed of the vehicle R1 to the junction A2 increases, the vehicle R1 may have a higher likelihood of arriving at the junction A2 during a time period before the time period tn, such as during the time period tn−1 or tn−2 and so forth, and the expected value EVA2 may correspondingly shift to such a time period before the time period tn.

While the expected value EVA2 of the vehicle R1 with respect to a particular location, such as the junction A2, may change as the location and/or direction of the vehicle R1 changes, the time period tn of arrival of the vehicle R1 at the junction A2, may change as the estimated average speed or estimated travel time tETA of the vehicle R1 to the particular location changes. In other words, EV may tend to change relative to location or direction, and an arrival time period tn may tend to change relative to estimated travel time tETA and/or speed.

While in previous cases the expected value EVA2 of the vehicle R1 relative to the junction A2 may be zero or fully represented by a single time period tn, the expected value EVA2 for the vehicle R1 may also be distributed over more than one time period, such as over a set of time periods tn−1, tn, and tn+1 and may approximately represent a confidence interval.

The expected value EVA2 may represent a probability the vehicle R1 will arrive at the junction A2, such as EVA2=0.90, and the expected value EVA2 may be equal to a sum of expected values for the set of time periods, such as EVA2=EVA2[tn−1]+EVA2[tn]+EVA2[tn+1].

In one case, the expected value EVA2[tn] and one or both of the expected values EVA2[tn−1] and EVA2[tn+1] may be non-zero since a non-zero probability may exist that the average speed of the vehicle R1 may increase or decrease between its present location and the junction A2, reducing or increasing the travel time tETA of the vehicle R1 to the junction A2. Non-zero values for the expected values EVA2[tn−1] and EVA2[tn+1] may be determined and represent a probability the vehicle R1 will arrive at the junction A2 during a time period before or after the time period tn, such as during one of the time periods tn−1 or tn+1, respectively. The expected value EVA2[tn] may be decreased commensurately, such as by EVA2[tn]=EVA2−EVA2[tn−1]−EVA2[tn+1].

In another case, both the expected value EVA2[tn] and the expected value EVA2[tn−1] may be non-zero since it is possible that the vehicle R1 will arrive at the junction A2 during either the time period tn or tn−1, such as if average speed of the vehicle R1 increases between its present location and the junction A2, reducing the estimated travel time tETA of the vehicle R1 to the junction A2.

A non-zero value for the expected value EVA2[tn−1] may be determined and represent a probability the vehicle R1 will arrive at the junction A2 during a time period before the time period tn, such as during the time period tn−1.

In another case, EVA2[t1] may be zero if it is not possible or improbable for the vehicle R1 to arrive at the junction A2 from its present location within the time period t1 within certain constraints (e.g. physical or legal limits).

Such probabilities may be based on past data, for example, that 25% of all traffic detected at the first location D1 heading toward the junction A2 in an eastbound direction arrives during a time period tn−1, 50% arrives during a time period tn, and 25% arrives during a time period tn+1. Then EVA2[tn−1] may be equal to 0.25×EVA2, EVA2[tn] may be equal to 0.50×EVA2, and EVA2[tn+1] may be equal to 0.25×EVA2, respectively.

In another case, 10% of all traffic detected at the first location D1 heading toward the junction A2 in an eastbound direction arrives during a time period tn−2, 17% arrives during a time period tn−1, 43% arrives during a time period tn, and 30% arrives during a time period tn+1. Then EVA2[tn−2] may be equal to 0.10×EVA2, EVA2[tn−1] may be equal to 0.17×EVA2, EVA2[tn] may be equal to 0.43×EVA2, and EVA2[tn+1] may be equal to 0.30×EVA2, respectively.

In another case, 32% of all traffic heading toward the junction A2 in an eastbound direction arrives during a time period tn−1, 52% arrives during a time period tn, and 15% arrives during a time period tn+1. Then EVA2[tn−1] may be equal to 0.32×EVA2, EVA2[tn] may be equal to 0.52×EVA2, and EVA2[tn+1] may be equal to 0.15×EVA2, respectively.

In another case, of a set of previous instances the vehicle R1 is detected at the first location D1 heading toward the junction A2 in an eastbound direction and then detected again at the second location D2. The vehicle R1 may have been observed or otherwise determined to have arrived at the junction A2 during a time period tn−1 in 58% of the set of previous instances, during a time period tn in 34% of the instances, and during a time period tn+1 in 8% of the instances, respectively. Then it may be estimated for a present case that EVA2[tn−1] may be equal to 0.58×EVA2, EVA2[tn] may be equal to 0.34×EVA2, and EVA2[tn+1] may be equal to 0.08×EVA2, respectively.

Further, one of ordinary skill in the art will recognize that a non-zero number of time periods may vary from one to a series of time periods as needed or defined, a distribution of an expected value EV over more than one time period may resemble a normal or other distribution based on available data (real-time or historical data, specific to the vehicle R1 or not), the expected value EV or its distributed portions may shift fore/aft some number of the time periods depending on changes in situation, that the number of time periods an EV is distributed within may vary with one or more durations of the time periods, and that time periods in a series of time periods may be uniform or non-uniform in duration.

Figure 3:
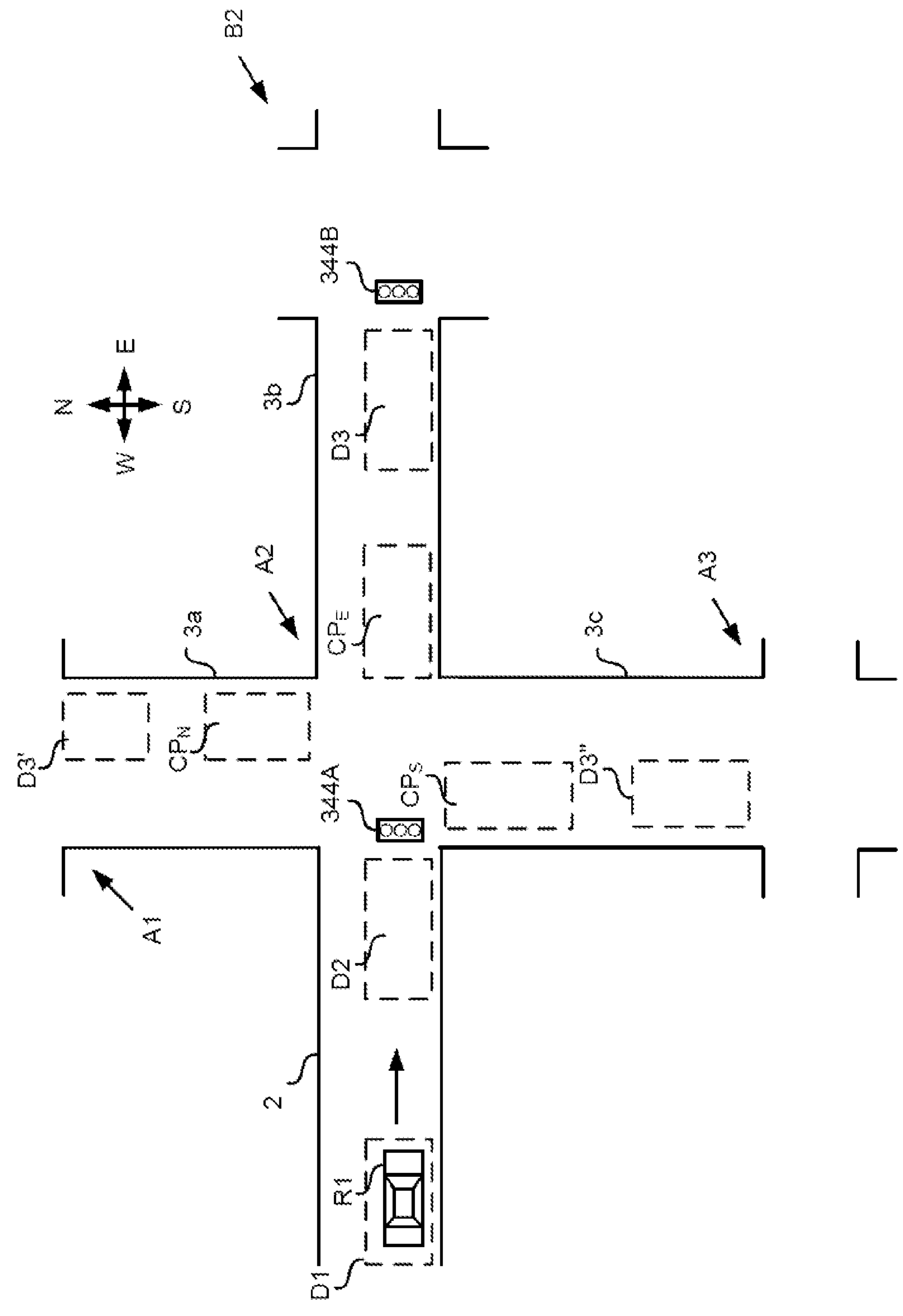
FIG. 3 is a diagram of a road segment 2 having a first location D1 and a second location D2 leading to a junction A2 as described by FIG. 2, a road segment 3*a* having a first location CPN and a second location D3' located in a northbound direction between the junction A2 and a junction A1, a road segment 3*b* having a first location CPE and a second location D3 located in an eastbound direction between the junction A2 and a junction B2, and a road segment 3*c* having a first location CPS and a second location D3" located in a southbound direction between the junction A2 and a junction A3, according to one example.

FIG. 3 is a diagram of a road segment 2 having a first location D1 and a second location D2 leading to a junction A2 as described by FIG. 2, a road segment 3*a* having a first location CPN and a second location D3' located in a northbound direction between the junction A2 and a junction A1, a road segment 3*b* having a first location CPE and a second location D3 located in an eastbound direction between the junction A2 and a junction B2, and a road segment 3*c* having a first location CPS and a second location D3" located in a southbound direction between the junction A2 and a junction A3, according to one example. The junction A2 and the junction B2 may each have at least one traffic signal 344A and 344B, respectively, to control traffic in each direction approaching.

The vehicle R1 may be traveling in an eastbound direction from the first location D1 toward the second location D2 as described by FIG. 2. There may exist a relationship between the vehicle R1 and the junction A2 as described by FIG. 2. The expected value EVA2 may be higher if there are no turns or other potential stopping locations between the first location D1 and the second location D2 than if there are turns or potential stopping locations between those locations.

A probability or expected value EVA2 that the vehicle R1 will arrive at the second location D2 during a time period to may be calculated or estimated as previously described. The location CPN may be an exit of the junction A2, and the location D3' may be an entrance to the junction A1. A relationship may exist between the road segment 3*a*, the location CPN, the location D3', and the junction A1 that is similar to the relationship between the first location D1, the second location D2, and the junction A2. The location CPE may be an exit of the junction A2, and the location D3 may be an entrance to the junction B2. A relationship may exist between the road segment 3*b*, the location CPE, the location D3, and the junction B2 that is similar to the relationship between the first location D1, the second location D2, and the junction A2. The location CPS may be an exit of the junction A2, and the location D3" may be an entrance to the junction A3. A relationship may exist between the road segment 3*c*, the location CPS, the location D3", and the junction A3 that is similar to the relationship between the first location D1, the second location D2, and the junction A2.

The vehicle R1 may concurrently have EVs relative to locations other than the junction A2, for example, the junctions A1, B2, and A3, and locations beyond that may be on a present, probable, or possible route of the vehicle R1. A relationship between the vehicle R1 and each of the junctions A1, B2, and A3 may have expected values EVA1, EVB2, and EVA3, respectively. The expected value EVA2 described in FIG. 1 may represent a probability of the vehicle R1 traveling from the first location D1 to the second location D2 on the road segment 2.

Further, components of the expected value EVA2 may represent a probability that the vehicle R1 will follow a certain direction when presented with more than one alternative direction, such as in a case the vehicle R1 approaches the junction A2 in an eastbound direction and may turn or proceed through the junction A2.

The expected value EVA2 may have EV components such as EVA2N, EVA2E, and EVA2S, each representing a probability the vehicle R1 turns left at and exits the junction A2 in a northbound direction, proceeds through the junction A2 in an eastbound direction, or turns right at and exits the junction A2 in a southbound direction, respectively.

The EVA2 may be expressed as a sum or approximate sum, of probabilities of possible directions of the vehicle R1 as it approaches the junction A2 from a present direction, such as EVA2=EVA2N+EVA2S+EVA2E. The EVA2 may be an approximate sum of the stated probabilities because there are other possible outcomes (such as U-turns), however likely or unlikely.

The sum of probabilities, and each of the EV components, that form the expected value EVA2 as the vehicle R1 approaches or enters the junction A2 in an eastbound direction may vary and be distinct from a sum of probabilities if the vehicle R1 approaches or enters the junction A2 from another direction, such as in a westbound, northbound, or southbound direction.

For example, an expected value EVA2 of the junction A2 on a westbound approach for the vehicle R1 may be EVA2=EVA2N+EVA2S+EVA2W, while the expected value EVA2 on a northbound approach may be EVA2=EVA2N+EVA2E+EVA2W, and values for the EV components EVA2N, EVA2E, EVA2W, EVA2S may vary from one direction of approach to another.

The expected value EVA2 may represent a probability of arrival of the vehicle R1 at the junction A2, or an entrance to the junction A2 such as the second location D2, while EVA2N, EVA2E, and EVA2S may represent probabilities of departure of the vehicle R1 from the junction A2 in northbound, eastbound, and southbound directions, respectively.

While the expected value EVA2 may be equal up to about one (100%), the approximate EV value components EVA2N, EVA2E, and EVA2S may be represented by portions of the expected value EVA2, for example, 0.30, 0.40, and 0.30, respectively.

The vehicle R1 may enter the junction A2 and exit the junction A2 at different time periods, and depending on a travel time and a direction through the junction A2 (e.g. traveling straight through a junction may require a different amount of time than making a left or right turn), and/or a signal timing (or crosswalk) status which may result in delay while the vehicle R1 is in the junction A2.

Each directional component of EVA2 may also be expressed as a distribution over one or more time periods, as previously discussed in FIG. 2. For example, because the expected value EVA2 may be distributed over one or more time periods, a subsequent compound EV such as the expected value EVB2 that includes the expected value EVA2 may be distributed over more than one time period.

In one case, the vehicle R1 may be located at the first location D1 and traveling toward the second location D2. The vehicle R1 may have an expected value EVA2, including an expected value EVA2E of proceeding straight through the junction A2 toward the junction B2, that is distributed among time periods tn and tn+1, such as each having values of EVA2[tn] and EVA2[tn+1], respectively.

In one case, an estimated travel time tETA(A2) to the junction A2 may be 10 seconds, the expected value EVA2 may be 0.98, with the EVA2[tn]=0.60 and the EVA2[tn+1]=0.38, and each time period tn may be 1 second in duration. The vehicle R1 may then have expected values of EVA2 [t10]=0.60 and EVA2 [t11]=0.38.

Further, if the vehicle R1 also has an EV component EVA2E=0.70, and if the estimated travel time tETA(A2B2) from the junction A2 to the junction B2 may be 15 seconds then EVA2B2 [10+15] may equal EVA2[t10]×EVA2E=0.60×0.70=0.42. Further, EVA2B2 [11+15] may equal EVA2[t11]×EVA2E=0.38×0.70=0.266.

In another case, the estimated travel time tETA(A2) from the first location D1 to the second location D2 may range from 8 to 10 seconds, and the estimated travel time tETA (A2B2) from the second location D2 to the third location D3 may range from 10 to 12 seconds. Thus an estimated travel time tETA(B2) for the vehicle R1 from the first location D1 to the third location D3 may be expected to range from (8+10) to (10+12) seconds, or 18 to 22 seconds.

In each case described above, an expected value EVA2B2 may represent a probability of the vehicle R1 traveling on the road segment 3*b* from the junction A2 to the junction B2.

An expected value EVA2A1 may represent a probability of the vehicle R1 traveling on the road segment 3*a* from the junction A2 to the junction A1. An expected value EVA2A3 may represent a probability of the vehicle R1 traveling on the road segment 3*c* from the junction A2 to the junction A3.

Then a present EV of the vehicle R1 traveling from the first location D1 through the junction A2 to one of the subsequent junctions A1, B2, and A3 may be expressed as a compound EV such as EVA1=EVA2×EVA2N×EVA2A1, EVB2=EVA2×EVA2E×EVA2B2, and EVA3=EVA2×EVA2S×EVA2A3, respectively.

A present EV of the vehicle R1 may also be calculated relative to locations beyond the junctions A1, B2, and A3. For example, a junction C2 may be located east of the junction B2. A present expected value EVC2 of the vehicle R1, such as in a case the vehicle R1 is at the second location D2, relative to the junction C2 may be expressed as a compound EV such as EVC2=EVA2E×EVA2B2×EVB2E×EVB2C2, and so on.

Further, the vehicle R1 may concurrently have an EV relative to one or more other locations, for example a junction A3 and/or a junction B2 (shown in FIG. 2), during the series of time periods t1 to at least tn, such as EVA3 [t1] to EVA3[tn] and/or EVB2[t1] to EVB2[tn], respectively.

The sum of EVs for the series of time periods t1 to at least tn with respect to the other locations, such as the junction B2, may be equal up to the expected value EVB2. In other words, the expected value EVB2 may be distributed over one or more time periods in the series of time periods t1 to at least tn.

In another case, the vehicle R1 may be located at the first location D1 and traveling toward the second location D2 as previously described. However, if the expected value EV(A2B2) is also distributed over time periods relative to a time the vehicle R1 leaves the junction A2, for example, tm−1, tm and tm+1 (with a travel time from the junction A2 to the junction B2 tETA(A2B2) is estimated to be 15 seconds and time intervals are one second), then the vehicle R1 may presently have an EV of arriving at the junction B2 at one of a time period t[n+(m−1)], t[n+m], t[n+(m+1)], t[(n+1)+(m−1)], t[(n+1)+m], and t[(n+1)+(m+1)] with respective expected values EVB2[t24]=0.60×0.25=0.15, EVB2[t25]=0.60×0.30=0.18, EVB2[t26]=0.60×0.15=0.09, EVB2[t25]=0.38×0.25=0.095, EVB2[t26]=0.38×0.30=0.114, and EVB2[t27]=0.38×0.15x=0.057.

Because t[n+m]=t[(n+1)+(m−1)] the respective probabilities of 0.18 and 0.095 are thus additive, and t[25]=0.275. Also, because t[n+(m+1)]=t[(n+1)+m], the respective probabilities of 0.09 and 0.114 are thus additive, and t[26]=0.204.

The aforementioned case is exemplary of the expected value EVA2B2 between the junction A2 and the junction B2 being distributed over more than one time period. Confidence may be higher for EVs of closer locations to the user and for time periods that will happen sooner.

The TMS 101 may use data from one or more vehicles, including the vehicle R1, to estimate or calculate a total EV with respect to one or more of the junctions A1, A2, A3, and B2 during one or more of the time periods, such as during t1 to tn, t1 to tn−1, and/or t1 to tn+1 and so on. Directional demand is further described by FIGS. 5A-8.

In one case, as the vehicle R1 approaches the junction A2 in an eastbound direction (e.g. from the west), the EV that the vehicle R1 may turn left EVA2N, go straight EVA2E, or turn right EVA2S may be estimated or assigned based on previous traffic detected to travel through the junction A2.

For example, these EV components may be represented by 0.30, 0.40, and 0.30, respectively. A sum of possible EVs at a particular location may be equal to about one (100%).

In another case, the EV components EVA2N, EVA2E, and EVA2S may be represented by 0.12, 0.63, and 0.25, respectively.

In another case, left turns at the junction A2 may yield to oncoming traffic that may be detected or assumed, or the left turn signal may not be green. The EV components EVA2N, EVA2E, and EVA2S may still be represented by 0.12, 0.63, and 0.25, respectively, but the time period or periods for the left turn direction may be expected to occur later or be more likely to occur later than those of the EV components EVA2E and EVA2S, if the vehicle R1 is likely to be delayed, such as by the aforementioned oncoming traffic or non-green left turn signal.

Consequently, the EV components EVA2N, EVA2E, and EVA2S of each direction (and/or their relative distributions over time periods) may be assigned to the same or different time periods.

In addition to a traffic signal status, EV of a direction and a location may vary for a variety of reasons, such as a turn restriction, a lane position of the user, a time of day (TOD), and/or a day of the week (DOW).

In one case, compound EV may be based on a travel lane where this data may be known or detected. For example, if the vehicle R1 is driving in a left lane then it is less likely to make a right turn than if it were in a right lane. If the vehicle R1 is in a right lane then it is less likely to make a left turn. A time period of arrival a location may also be partly dependent upon a present, average or likely speed of a current lane.

In another case, compound EV may be based on a traffic volume. When traffic volumes are higher at certain times then EVs may be more or less likely to turn at certain locations, or change speed more frequently or to a larger degree. A time period of arrival at a location may also change due to a change in an average speed of the vehicle R1.

In another case, left turns at the junction A2 may not be permitted from the eastbound direction, and the expected values EVA2N, EVA2E, and EVA2S may be represented by, for example, 0.00, 0.83, and 0.17, respectively.

In another case, right turns at the junction A2 may yield to a pedestrian crosswalk and pedestrians may be detected or assumed to be crossing. The expected values EVA2N, EVA2E, and EVA2S may be represented by, for example, 0.08, 0.75, and 0.17, respectively, but the time periods for the right turn direction may vary from the other directions if the vehicle R1 is likely to be delayed, such as by the aforementioned detected or assumed pedestrian traffic. Consequently, one or more of the expected values EVA2N, EVA2E, and EVA2S of each direction may be estimated to occur in different time periods, such as the EVA2S of 0.17 occurring shifting to a time period after that of the EVA2N and EVA2E when the junction A2 may be estimated not to have pedestrian traffic crossing in the east or west direction in conflict with the vehicle R1 turning right from the road segment 2 onto the road segment 3*c*.

In another case, right turns at the junction A2 may not be permitted from the eastbound direction, and the expected values EVA2N, EVA2E, and EVA2S may be represented by, for example, 0.08, 0.92, and 0.00, respectively.

In another case, the vehicle R1 may be known to be traveling on a specific route that includes passing through the junction A2 in the eastbound direction toward the junction B2. The expected values EVA2N, EVA2E, and EVA2S may then be represented by about 0.00, 1.00, and 0.00, respectively. Further, these EVs may be assigned at an earlier time, such as at a starting point of the vehicle's R1 trip, which may be before the vehicle R1 is detected at the first location D1. In knowing this information earlier, the TMS 101 may make certain decisions about EVs and timing with a higher degree of confidence.

For a direction of travel approaching the junction A2, probabilities may vary depending on variables that may be known or detected. Variables may depend on, for example, one or more of historical data, a time of day, day of the week, a present condition or user, or data availability regarding a vehicle class or type, or a particular vehicle, driver, and/or user.

A present condition may include a time of day or day of week, road use restrictions such as a prohibition on a turn direction, a parking or stopping permission, a class or type of vehicle, a particular vehicle's authorization or past action, and/or other available historical data.

In one case, the EV component EVA2N may approach or be equal to zero for the vehicle R1 if left turns are prohibited during the time horizon TH or a time period during the time horizon TH.

In another case, if the vehicle R1 is known and may be identified by the TMS 101, and there is a record of one or more previous instances of the vehicle R1 approaching the junction A2 from the second location D2, then the assigned EV components EVA2N, EVA2E, and EVA2S for the vehicle R1 may have values based on the one or more previous instances of the vehicle R1 approaching the junction A2 from the second location D2.

In another case, the assigned EV components EVA2N, EVA2E, and EVA2S for the vehicle R1 may have values specific to a present time of day and/or day of week that may vary from values assigned for another time of day and/or day of week.

In another case, if the vehicle R1 may be identified by the TMS 101 as belonging to a specific class of vehicles, such as tractor trailers, then the assigned EV components EVA2N, EVA2E, and EVA2S for the vehicle R1 may have values different than from those for general traffic or another class of vehicles.

In another case, the assigned EV components EVA2N, EVA2E, and EVA2S for the vehicle R1 may have values specific to a predetermined route, such as if the vehicle R1 is a transit bus. If the transit bus is known to be in service and circulating on a specified route then EV components may be precisely defined for the vehicle R1, such as EVA2N=0, EVA2E=1, and EVA2S=0. A similar process may be used in a case of another vehicle with a route that is defined but from which there may be deviation. In such a situation the EV components may be equal to somewhat less than 1 and somewhat more than zero for a location, such as the junction A2, since the route may be somewhat less predictable than that of the fixed route transit bus.

As the vehicle R1 moves from the first location D1 toward the second location D2, the estimated duration of the travel time tETA of the vehicle R1 to the second location D2 may decrease (travel time tETA estimate may also increase if there are delays) and the expected value EVA2 of a time period tn having an expected value EVA2 or portion thereof due to the anticipated arrival of the vehicle R1 at the second location D2, may remain the same, increase or decrease in the time period tn or in another time period such as time period tn+1, tn+2, tn−1, or tn−2 and so forth.

The number of time periods having all or a portion of the expected value EVA2 for the vehicle R1 may also change as probabilities change and may include more or fewer time periods as the vehicle R1 moves closer to the second location D2 in terms of distance.

Further, if the vehicle R1 changes path or speed, and the likelihood of the vehicle R1 arriving at the second location D2 (if at all) during the time period tn that coincides with a most recent travel time tETA estimate decreases, then the expected value EVA2 for the time period tn may decrease.

The vehicle R1 may be located at the first location D1 and may have an estimated travel time, such as the tETA, relative to the second location D2, and may have a probability and may have a time aspect relative to the second location D2. The estimated tETA may be based on assumptions or calculations of how long the vehicle R1 is expected to take to travel from the first location D1 to the second location D2.

On a straight road segment with no turns or likely stopping areas in a direction of travel between the first location D1 and the second location D2, a travel time tETA to the junction A2 may be estimated in one or more ways.

In one case, the estimated travel time tETA may be determined based on a distance between the first location D1 and the second location D2 and an average speed, such as tETA=distance/average speed.

In another case, the estimated travel time tETA between the first location D1 and the second location D2 may be determined using general historical travel time data for the same or a similar road segment.

In another case, the estimated travel time tETA between the first location D1 and the second location D2 may be determined using a specific subset of historical data for the same or a similar road segment, such as based on a day of the week or a time of day, a vehicle class or type, a user with a known driving history, and/or another known present condition.

The expected value EVA2 may change based on a present condition such as traffic volume (queue delays), traffic signal status, and/or intended path or route.

The expected value EVA2 related to the vehicle R1 arriving at the second location D2 may be assigned to a present or future time period to within which the travel time tETA coincides.

The expected value EVA2 for the vehicle R1 may be estimated as far as the vehicle's R1 route is defined or up to a future time, such as to a time horizon TH with duration from a present moment or time period t1 to the future time. The expected value EVA2 relative to the second location D2 may be further estimated based partly on traffic detected at the second location D2, for example the junction A2, and adjacent locations.

For example, if there are queue delays at the second location D2 that are expected to affect the travel time of the vehicle R1 as it approaches the second location D2 then the expected value EVA2 may be shifted to a later time period such as tn+1 or tn+2 and so on due to anticipated delay.

In one case, the time horizon TH may be one minute and each time period may have a duration of 5 seconds (t1=0 seconds to t2, t2=5 seconds to t3, t3=10 seconds to t4, etc.). Travel time tETA for the vehicle R1 from the first (present) location D1 to the second (future) location D2, approximately located at the junction A2, may be estimated to be 32 seconds. Further EVs relative to one or more other locations may also be considered. Because the travel time tETA to the junction A2 for the vehicle R1 is less than the time horizon TH, one or more time periods may be defined from at least the present moment until the vehicle R1 is estimated to arrive at the junction A2, such as during a time period t7. The expected value EVA2 may be determined to be greater than zero and up to a value of approximately one during a time period t7.

Further, as a time period to elapses the expected value EVA2 may shift to a different time period. In this case, after five seconds has elapsed from a present moment, the non-zero expected value EVA2 may transition from the time period t7 to a time period t6 (e.g. EVs may change such that EVA[t6]=EVA2 and EVA[t7]=0) as the vehicle R1 moves closer to the junction A2. The set of EVs may correspondingly shift too.

In another case, the time horizon TH may be ten minutes and each time period may have a duration of 3 seconds. Travel time tETA for the vehicle R1 from a first (present) location to a second (future) location may be estimated to be 55 seconds, while EVs relative to one or more other locations may also be considered. The expected value EVA2 may be determined to be greater than zero and up to a value of approximately one during a time period t19.

In another case, the time horizon TH may be five minutes and each time period may have a duration of 0.5 seconds. Travel time tETA for the vehicle R1 from a first (present) location to a second (future) location may be estimated to be 33.2 seconds, while EVs relative to one or more other locations may also be considered. The expected value EVA2 may be determined to be greater than zero and up to a value of approximately one during a time period t67.

In another case, the time horizon TH may be thirty minutes and each time period may have a duration of 30 seconds. Travel time tETA for the vehicle R1 from a first (present) location to a second (future) location may be estimated to be 42 seconds, while EVs relative to one or more other locations may also be considered. The expected value EVA2 may be determined to be greater than zero and up to a value of approximately one during a time period t2.

One having ordinary skill in the art will recognize that a time horizon, a time period duration, a number of time periods within the time horizon, and corresponding time periods may vary with respect to one another in a multitude of ways while estimating or assigning EVs for a particular vehicle or user relative to a particular location during a time period or range of time periods.

Further, the EV of one or more of those time periods may vary due to a change in location, heading and/or speed of the vehicle, user or detected traffic, as well as other factors such as those described below.

Once the vehicle R1 travels through the junction A2, the expected value EVA2 or component expected values EVA2N, EVA2E, and EVA2S of the vehicle R1 may change, such as through a step change, in value since the vehicle R1 is most likely no longer approaching or headed toward the junction A2.

The EV of the vehicle R1 at the junction A2, such as after the vehicle R1 exits an approach, may approach zero or be removed from some or all future time periods presently under consideration by the TMS 101, such as for some or all time periods within the time horizon TH.

Further, an EV of the vehicle R1 relative to another location may change after the vehicle R1 passes through the junction A2.

In one case, if the vehicle R1 is detected as having exited the junction A2, such as by entering one of the locations CPN, CPE, or CPS, then updated EVs may be calculated with respect to the junctions A1, B2, and A3, and the use of the expected value EVA2 and its EV components EVA2N, EVA2E, EVA2S, may no longer need to be considered for the vehicle R1.

For example, if the vehicle R1 is detected as having exited the junction A2 and entered the location CPN then expected value EVA2A1 of the vehicle R1 may then be equal to up to one (100%) while EVA2B2 and EVA2A3 of the vehicle R1 may then be equal to zero, and the EV components EVA2N, EVA2E and EVA2S of the vehicle R1 may then be equal to about 1, 0, and 0, respectively.

Alternately, if the vehicle R1 may not be detected or identified at one of the locations CPN, CPE, or CPS after being detected at a prior location, such as the first location D1 or the second location D2, then a time estimate may be used to determine how long to consider the EVs of the vehicle R1 relative to the junction A2 and a next junction such as A1, B2, and/or A3.

For example, if the vehicle R1 is detected to be traveling toward the junction A2 at the first location D1, then the expected values EVA2, EVA1, EVB2, and/or EVA3 and their respective time periods of occurrence may be estimated.

In one case, a time estimate may be based on a past or present average travel time, or travel time range, between a prior detection location (e.g. the first location D1) and the junction A2, and between the junction A2 and one or more possible next junctions.

In another case, if the vehicle R1 may not be detected or identified at one of the locations CPN, CPE, or CPS after being detected at the prior location, then one or more of the expected values EVA1, EVB2, and EVA3 attributed to the vehicle R1 relative to the junctions A1, B2, and A3, respectively, may be considered from a time the vehicle R1 is first detected at the prior location, such as the first location D1 or the second location D2, up to the remaining duration of the present time horizon TH.

For example, EVs may be included in one or more time periods between a present time period and a time period that coincides with an end of the present time horizon TH, and during or before which the vehicle R1 is probabilistically estimated to arrive at the respective locations.

In other words, if the vehicle R1 is detected at the prior location and cannot be detected or identified again prior to the junctions A1, B2, or A3 then an estimated value EV contribution may be determined for one or more of the junctions A1, B2, and A3 for the vehicle R1 based on current or historic estimates for general traffic for one or more time periods between a present time period t1 up to a time period tn, such as one that occurs at the end of the present time horizon TH.

If the vehicle R1 route is not known or specified but historical traffic movement data for traffic in general, a subset of traffic, or for the vehicle itself (if the vehicle may be identified) is available, then a time period or time periods when the vehicle R1 is estimated to arrive at a subsequent location, such as the junction A1, B2, or A3, may be estimated.

In general, the range of estimated time periods may be broader in the case the vehicle R1 is detected but not identified, and/or a route of the vehicle R1 is not known, than in a case that the vehicle R1 is identified or the route of the vehicle R1 is known, and the vehicle R1 may be identified again prior to the subsequent location, such as between the junction A2 and the other junctions A1, B2, and A3.

Where the route is known/defined for the vehicle R1, determination of travel time tETA, and the time period tn when the vehicle R1 is estimated to arrive at each location of interest, may be more precise.

In one case, if overall vehicle traffic approaching the junction A2 from an eastbound direction is known to historically have an average travel time tETA of 40 seconds to travel from the first location D1 to the second location D2 (or a calculation using a speed limit and distance between the first location D1 and the second location D2 yields a result of 40 seconds), then the TMS 101 may assign a fixed, predetermined expected value EVA2 for a time period tn when a vehicle detected to be traveling eastbound at the first location D1 is estimated to arrive at the second location D2 (approximately the junction A2), the travel time tETA duration would thus end within the time period tn of the series of time periods t1 to tn.

If each time period in the set of time periods t1 to tn is 10 seconds in duration, then there may be at least four time periods t1 through t4 between a present moment and when the vehicle is estimated to arrive at the second location D2 at time tETA. Exemplary expected values for those time periods may be assigned as EVA2[t1]=0, EVA2[t2]=0, EVA2[t3]=0, and EVA2[0]=1. Expected value EVA2[t5] for a time period t5 and time periods beyond, if defined, may be equal to zero.

Further, if a present time horizon TH is one minute then subsequent time periods beyond the present time horizon, such as EVA2[t7] and time periods that follow may have different durations from those before the time period t7, such as a duration of one minute, until the subsequent time period is within range of the present time horizon. Or the subsequent time periods beyond the present time horizon may be considered just one time period, or may not be factored into calculations altogether during the present time period t1.

In another case, the expected value EVA2[t4] may be less than one, such as EVA2[t4]=0.99 or EVA2[t4]=0.95, to account for a possibility the vehicle may not arrive at the second location D2, during the time period t4 or perhaps at all, depending on available historical data.

In another case, if each time period in the set of time periods t1 to at least tn is four seconds in duration, then there may be at least ten time periods t1 through t10 between a present moment and when the vehicle may be estimated to arrive at the second location D2 at time tETA.

In another case, if each time period in the set of time periods t1 to at least tn is 25 seconds in duration, then there may be at least two time periods t1 through t2 between a present moment and when the vehicle may be estimated to arrive at the second location D2 at time tETA.

In another case, if each time period in the set of time periods t1 to at least tn is 60 seconds in duration, then there may be at least one time period t1 between a present moment and when the vehicle may be estimated to arrive at the second location D2 at time tETA.

In another case, if overall vehicle traffic approaching the junction A2 from an eastbound direction historically averages within a range of 34 to 47 seconds to travel from the first location D1 to the second location D2, and each time period in the set of time periods t1 to at least tn is 10 seconds in duration, then the TMS 101 may assign an expected value of arrival of the detected vehicle with respect to the junction A2 to one or more upcoming time periods such as the series of time periods t1 through t5 as described by a previous case above. Exemplary EVs may be assigned, such as EVA2[t1]=0, EVA2[t2]=0, EVA2[t3]=0.33, EVA2[t4]=0.33, EVA2[t5]=0.33. Expected value EVA2[t6] for a time period t6 and time periods beyond, if defined, may be equal to zero.

In another case, exemplary EVs may be assigned, such as EVA2[t1]=0, EVA2[t2]=0, EVA2[t3]=0.20, EVA2[t4]=0.72, EVA2[t5]=0.08, and the sum of expected values with respect to the junction A2 for the series of time periods t1 to at least tn may be equal up to approximately one.

In another case, exemplary EVs may be assigned, such as EVA2[t1]=0, EVA2[t2]=0, EVA2[t3]=0.12, EVA2[t4]=0.65, EVA2[t5]=0.23.

One of ordinary skill in the art will recognize that an expected value for a time period may vary between zero and one with respect to a particular location, may depend on a variety of known or estimated conditions, and may change dynamically with conditions. Further, a sum of expected values EV for a vehicle during a series of time periods t1 to at least tn relative to a particular location may be equal up to approximately one. Further, duration of time periods in a series of may be uniform, or may vary in duration.

In addition to the aforementioned cases, rather than assigning expected values based on overall available data, the TMS 101 may estimate an arrival time and probability of arrival at a subsequent location by applying additional logic to assign expected values to known or detected traffic based on a subset of overall available data.

In one case, expected values EVA2 for the series of time periods t1 to at least tn for detected traffic in an eastbound direction from the first location D1 to the second location D2 may be assigned by the TMS 101 based partly or solely on average historical travel times of vehicle traffic approaching the junction A2 during certain days of a week, such as weekend days or weekdays, and/or during certain times of day such as during certain morning hours, mid-day hours, evening hours, and night time hours.

In another case, expected values EVA2 for detected traffic in an eastbound direction from the first location D1 to the second location D2 may be assigned by the TMS 101 based partly or solely on a present traffic volume or travel time on the road segment 2 (such as in a direction between the first location D1 and the second location D2 or in a direction from the second location D2 and the first location D1), on another road segment approaching the junction A2, on a road segment connected to or within a distance of the road segment 2, or on a road segment within a particular area.

Presence of traffic on the road segment 2 traveling from the first location D1 toward the second location D2 may tend to increase travel time and decrease average speed on the road segment 2. This may result in a shift in an expected value EVA2[tn] of detected traffic from an earlier time period to toward a later time period such as tn+1, effectively lowering expected values of earlier time periods in a series of time periods, and increasing expected values of later time periods in the series of time periods.

In another case, increased traffic volume or travel time in an opposite direction on the road segment 2 (e.g. in a westbound direction) may affect expected values EV in the direction from the first location D1 to the second location D2 as well, such as by increasing a probability that traffic in the eastbound direction waiting to turn left to go in a northbound direction may delay traffic flow traveling eastbound from the first location D1 to the second location D2, or through to an exit of the junction A2 such as the locations CPN, CPE, and CPS.

In another case, if a speed or a vehicle class of a detected vehicle R1 is known, expected values EVA2 for the series of time periods t1 to at least tn for detected traffic from an eastbound direction from the first location D1 to the second location D2 may be assigned by the TMS 101 based partly or solely on average historical travel times of vehicles of a same or similar vehicle class, or moving in an approximately same speed range approaching the junction A2.

For example, a tractor trailer may be considered to be in a different vehicle class than a passenger car. The vehicle class of the tractor trailer may tend to accelerate more slowly, as well as take longer to stop, and may be assigned a different expected value EVA2 for one or more of the time periods in the series of time periods t1 to at least tn than that of the vehicle class of the passenger car.

If the detected vehicle R1 is traveling above or below a rate of speed (or inside or outside of a speed range) within a distance of the junction A2 then the probabilities assigned to next EV may be adjusted to reflect the increased or decreased likelihood the vehicle R1 will make a turn or go straight as the vehicle R1 approaches the junction A2.

In another case, if the road segment 2 has more than one travel lane in a direction between the first location D1 and the second location D2, and a travel lane of detected traffic is known, expected values EVA2 for the series of time periods t1 to tn for the vehicle R1 in the eastbound direction from the first location D1 to the second location D2 may be assigned by the TMS 101 based partly or solely on traffic specific to that travel lane.

For example, if the road segment 2 has two travel lanes in the eastbound direction from the first location D1 toward the second location D2, then traffic detected in a left travel lane may have a first set of expected values EVA2LL[t1] to EVA2LL[tn] assigned by the TMS 101 for the series of time periods t1 to tn. That set of expected values may differ from a second set of expected values EVA2RL[t1] to EVA2RL[tn] that may be assigned for the series of time periods t1 to tn for vehicle traffic detected in a right travel lane.

Average travel times may vary between adjacent lanes on road segments for a variety of reasons, including the likelihood of delays in left lanes due to left turn traffic delaying other traffic that is proceeding straight, in left lanes caused by traffic waiting to turn due to oncoming traffic or a signal status of a left turn signal, in left turn-only lanes that have queues backed up into an adjacent lane, compared with traffic in a middle lane that is more likely to have vehicle traffic proceeding straight and not delayed by turning movements, and right turn lanes which may have slower traffic, slower traffic preparing to turn right, traffic waiting to turn right, or for which right turns may be delayed due to restrictions due to a signal status, such as no turn on red.

In another case, a signal phase and timing (SPaT) status may be known for one or more junctions, such as the junction A2, expected values EVA2 for the series of time periods t1 to at least tn for detected traffic from an eastbound direction from the first location D1 to the second location D2 may be assigned by the TMS 101 based partly or solely on a present or upcoming SPaT status.

For example, in a case a traffic signal for the junction A2 may presently be green or will be green in a next or subsequent phase in a direction of travel of the vehicle traffic detected, then travel time may be estimated to be lower and EVA2 may shift closer to t1.

Conversely, in a case the traffic signal 344A for the junction A2 is not green in the direction of travel of the vehicle traffic detected, or there is another signal phase that may delay such vehicle traffic detected, then travel time may be estimated to be higher and EVA2 may increase for one or more of the time periods in the series of time periods t1 to at least tn further from the time period t1 while decreasing for one or more of the time periods closer to t1. This may be due to an increased probability of a presence of, for example, a queue delay for traffic arriving at the junction A2 (such as the second location D2), a pedestrian walk signal in a cross direction preventing or delaying vehicle traffic flow, or a railroad crossing gate crossing status, or some combination of two or more of these.

Some of the aforementioned scenarios may represent examples of open loop processes for estimating probability of arrival and travel time tETA of the vehicle R1 detected at the first location D1 relative to the second location D2 (e.g. the junction A2).

While open loop cases described above may use historical data, a pattern of a detected vehicle population, or a subset of the detected vehicle population data to assign expected value EVA2 for vehicle traffic that may not be specifically identified again (e.g. a vehicle ID is not known), in a case a particular vehicle R1 or user may be identified, the EVA2 may be assigned by the TMS 101 based partly or solely on data specific to that vehicle or user.

Exemplary ways the vehicle R1 may be identified include via a toll tag, License Plate Recognition (LPR) technology, a mobile device, a Bluetooth reader, or another device or technique that may be used to identify the vehicle R1. The vehicle R1 may be detected at the first location D1 by a fixed sensor or by a mobile sensor associated with the vehicle R1. Also, presence of the vehicle R1 may be estimated or derived from one or more data sources, which may include data from a fixed sensor, a mobile sensor or another source, such as a probabilistic or deterministic derivation of a present location of the vehicle R1.

In a case the vehicle R1 is detected or estimated to be at or near the first location D1, and the vehicle R1 may be specifically identified, then an expected value EVA2 may be estimated for the vehicle R1 with respect to one or more locations, such as the second location D2 or the junction A2 and subsequent locations (see FIG. 2) based on data specific to that known vehicle R1. Both open and/or closed loop processes may then be used to estimate EVs for the series of time periods t1 to at least tn of the vehicle R1 with respect to the locations.

In a case the vehicle R1 has a past record of traveling the road segment 2, the TMS 101 may also consider EVs for the vehicle R1 based on a process that may use aforementioned data subsets for generic traffic detected. However, if past data for the known vehicle R1 is available, and the vehicle R1 has exhibited a pattern of taking one action or direction over another then the TMS 101 may assign EVs and time periods (and may therefore generate unique confidence intervals) to the vehicle R1 pattern based on a past record of the vehicle R1 or based on a class of the vehicle R1 type rather than for general traffic data for the same road segment 2.

If there is past data associated with the known vehicle R1, for example, that the vehicle R1 averages within a range of 38 to 42 seconds to travel from the first location D1 to the second location D2, and each time period in the set of time periods t1 to tn is 10 seconds in duration, then the TMS 101 may assign an expected value EVA2 of arrival to the known vehicle R1 with respect to the junction A2 for one or more upcoming time periods, such as the series of time periods t1 through t5 as described by a previous case above, that is specific to the known vehicle R1. Exemplary expected values may be assigned as EVA2[U]=0, EVA2[t2]=0, EVA2 [0]=0.40, EVA2[t4]=0.48, EVA2[t5]=0.12, and differ from a previous example for overall traffic in a case the vehicle R1 is detected but not identified.

In a case the vehicle R1 may be detected but not identified (e.g. may be detected by a detector as traffic) the vehicle R1 may be assigned an EV to arrive at a junction, such as the second location D2 or the junction A2, based on a general pattern for a road segment, such as the road segment 2 between a present location of the vehicle R1 and the junction A2. EVs for possible directions of the vehicle R1 through the junction may be assigned based on a general set of values. EVs for subsequent road segments and junction directions may also be assigned based on general values for those road segments and junction directions with respect to the present location of the vehicle R1, or a location where the vehicle R1 was most recently detected.

In one case, the vehicle R1 may be detected at the first location D1 and not identifiable but known to be traveling toward the junction A2. Exemplary general values of EVA2=0.95, probabilities of EVA2N, EVA2E and EVA2S, and general EVA1A2=0.90 then current probabilities of EVA1, EVB2 and EVA3 may be assigned.

As the vehicle R1 moves toward the junction A2 and is detected at the second location D2 then current probabilities of EVA1, EVB2 and EVA3 may change by that point, such as by increasing EVA2 to 0.95 due to an increased likelihood the vehicle R1 will arrive at the junction A2.

The second location D2 may approximately represent an entrance to the junction A2 while each of the locations CPN, CPE, and CPS may approximately represent an exit to the junction A2, respectively.

Once the vehicle R1 passes through the junction A2, the current probabilities of EVA1, EVB2 and EVA3 may further change because the probabilities EVA2N, EVA2E, and EVA2S may be detected to change, depending on sensor availability.

In one case, if the vehicle R1 is then detected at the location CPN then probabilities EVA2N, EVA2E, and EVA2S for the vehicle R1 with respect to the junction A2 as described above may be redefined.

Because the vehicle R1 may be detected at the location CPN, the expected value EVA2N may be approximately equal to one, while the EVA2E and EVA2S may be approximately equal zero.

The vehicle R1 expected value EVA1 may increase while EVB2 and EVA3 may decrease, such as EVA1=EVA2N×EVA2A1=EVA2A1, EVB2=EVA2E×EVA2B2=0, and EVA2S×EVA2A3=0.

In another case, if the vehicle R1 is detected at the second location D2 and then at the location CPE then probabilities EVA2N, EVA2E, and EVA2S for the vehicle R1 with respect to the junction A2 as described above may be redefined, such that the expected value EVA2E may be approximately equal to one, while the EVA2N and EVA2S may be approximately equal zero.

The vehicle R1 expected value EVB2 may increase while EVA1 and EVA3 may decrease, such as EVA1=EVA2N×EVA2A1=0, EVB2=EVA2E×EVA2B2=EVA2B2, and EVA2S×EVA2A3=0.

Similarly, if the vehicle R1 is detected at the second location D2 and then at the location CPS then the vehicle R1 expected value EVA3 may increase while EVA1 and EVB2 may decrease, such as EVA1=EVA2N×EVA2A1=0, EVB2=EVA2E×EVA2B2=0, and EVA2S×EVA2A3=EVA2A3.

In another case, if the vehicle R1 is detected at the second location D2 and then it is not detected again until a location further from the junction A2 than an exit location (e.g. CPN, CPE, CPS), such as the location D3, then the vehicle R1 expected values may not change between the time the vehicle leaves the second location D2 and is detected again at the location D3. This may occur in a case the vehicle R1 is not identifiable at the second location D2. This may occur in a case the vehicle R1 is not identifiable at the second location D2.

This may delay updated calculations of EVA1=EVA2N×EVA2A1=0, EVB2=EVA2E×EVA2B2=1, and EVA3=EVA2S×EVA2A3=0.

In another case, if the vehicle R1 is detected at the second location D2 but not identified, then the vehicle R1 expected values may not change again after the vehicle leaves the second location D2.

Calculations of EVA1=EVA2N×EVA2A1=X, EVB2=EVA2E×EVA2B2=Y, and EVA3=EVA2S×EVA2A3=Z may not be updated again.

In another case the vehicle R1 may be detected and identified (e.g. may be detected by a detector as a particular vehicle and may be detected again at another location).

An EV to arrive at a junction, such as the second location D2 or the junction A2, may be assigned a value based partly or solely on a pattern specific to the particular vehicle R1 for the road segment 2 between a present location of the vehicle R1 and the junction A2.

EVs for possible directions of the vehicle R1 through the junction A2 may be assigned based partly or solely on a set of values specific to the particular vehicle R1, such as a previous direction of the vehicle R1 through the junction A2.

EVs for subsequent road segments and junction directions may also be assigned based partly or solely on values specific to the particular vehicle R1 for those road segments and junction directions with respect to the present location of the particular vehicle R1, or a location where the particular vehicle R1 was most recently detected.

In a case the vehicle R1 may be detected, identified, and an intended route of the vehicle may be known, an EV to arrive at a location on some or part of the intended route of the vehicle R1 may be assigned based partly or solely on the intended route. Expected value EVB2 may represent a present probability of the vehicle R1 going from the first location D1 to a subsequent location, such as a location D3, on the road segment 3*b* and indicative of arrival at the junction B2. This may be calculated by EVA2×EVA2B2.

The vehicle R1 may then be detected in a location CPE after the vehicle R1 passes through the junction A2. This may indicate the vehicle R1 is proceeding in a direction of the junction B2 and not the locations A1 or A3. Consequently the probability of expected value EVA2B2 may increase while expected values EVA2A1 and EVA2A3 may decrease.

An EV may be a sum, product or composite of two or more probabilities. For example, because there is more than one direction the vehicle R1 may take at the junction A2 as it approaches the junction A2 in an eastbound direction, the EVA2 of the vehicle R1 relative to a location subsequent to the junction A2 on a possible route of the vehicle R1, may include a probability EVA2N the vehicle R1 will turn left and go in a northbound direction, a probability EVA2S of turning right and heading in a southbound direction, and/or a probability EVA2E of going straight through the junction A2 in an eastbound direction.

One or more of the EVA2 and component probabilities EVA2N, EVA2S and EVA2E of the EVA2 may be determined, for example, by derivation or assignment based on available data.

In one case, the component probabilities EVA2N, EVA2S and EVA2E of the EVA2 may be approximately equal to 0.33, 0.33 and 0.34, respectively, and the sum of the component probabilities EVA2N, EVA2S and EVA2E may be equal to the EVA2. From the first location D1 to the second location D2, there may be an EVA2 representing a probability that the vehicle R1 will arrive at the second location D2, and further, there may be a set of probabilities EVA2N, EVA2S and EVA2E related to a next direction of the vehicle R1 at the junction A2.

In another case, the component probabilities EVA2N, EVA2S and EVA2E of the EVA2 may be approximately equal to 0.08, 0.12 and 0.80, respectively, and the sum of the component probabilities EVA2N, EVA2S and EVA2E may be equal to the EVA2.

In another case, where left turns are prohibited, the component probabilities EVA2N, EVA2S and EVA2E of the EVA2 may be approximately equal to 0.00, 0.18 and 0.82, respectively, and the sum of the component probabilities EVA2N, EVA2S and EVA2E may be equal to the EVA2.

There are many reasons why travel time tETA may vary, including the presence of traffic control devices (e.g. red lights in a direction of travel of the vehicle), the presence of other vehicles that affect or impede the user's movement, response time of the user (e.g. time to begin moving after a traffic light turns green), changes in speed or speed limits along a route, various rates of acceleration and deceleration, turns, and weather (e.g. snow, liquid, debris or obstructions on the road) that slow or impede movement of a user.

As a result, there may be a distribution of EV during one or more time periods to when the user may be expected to arrive at the location. If the location is a signalized junction, such as the junction A2, then the traffic signal in a direction of travel of the vehicle R1 of the junction A2 may be in one of a number of phase sets when vehicle arrives.

A signal status may affect travel time, and potentially EV if vehicle R1 changes route or path in response to the signal status. Further, EV and tETA may be partly dependent upon variable conditions. For examples, turns with time of day (TOD) restrictions, a likelihood of turns or U-turns due to TOD or traffic volume or delays, and traffic queues may change EV of one or more time periods by changing, advancing or delaying EV values over a series of one or more time periods.

Figure 4:
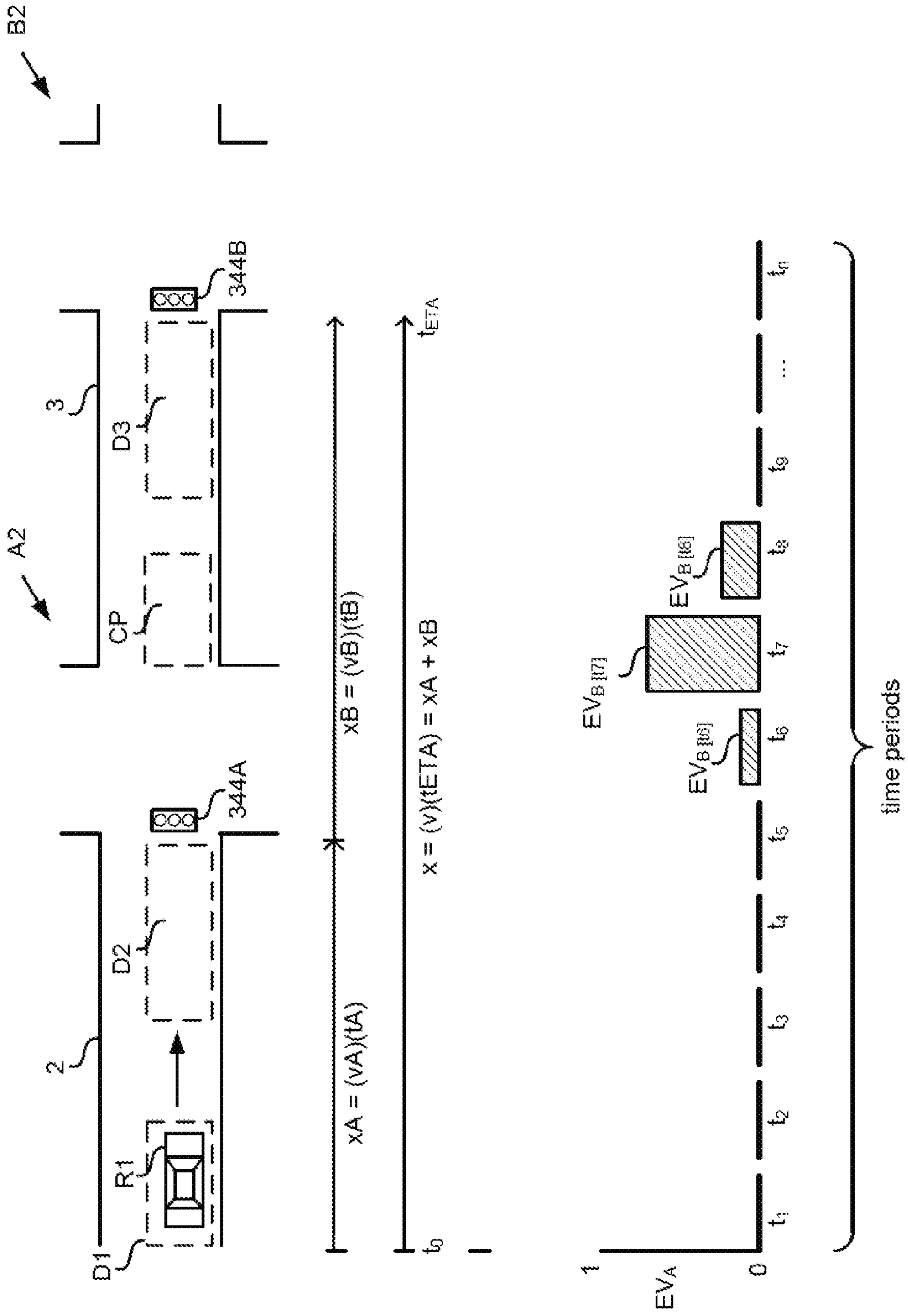
FIG. 4 is a diagram of a portion of that shown in FIG. 3 including the road segment 2, the junction A2, the road segment 3*b*, the junction B2 and so on, according to one example.

FIG. 4 is a diagram of a portion of that shown in FIG. 3 including the road segment 2, the junction A2, the road segment 3*b*, the junction B2 and so on, according to one example.

In a case the vehicle R1 is traveling from the present location D1 through the junction A2 en route to the junction B2, a travel time tETA of the vehicle R1 between the present location D1 and the junction B2 may be determined by x=vt, which may be determined from two time components tA2 and tB2 which represent travel time for the vehicle R1 from the present location to the junction A, and from the junction A2 to the junction B2, respectively.

The traffic signal 344A at the junction A2 may display a green, yellow or red signal in the direction of travel of the vehicle R1 as the vehicle R1 approaches the junction A2.

The vehicle R1 is responsive to the signal displayed, the time tETA relative to the junction B2 may vary based on the signal displayed by the traffic signal 344A, and may affect the EVB2 of, and time period(s) during which the vehicle R1 is anticipated to arrive at the junction B2.

In a case the signal 344A at the junction A2 is red and the vehicle R1 has to slow or stop the vehicle R1 may be delayed, lowering the average velocity and increasing the time to arrive at the junction A2 and subsequent locations from a present location of the vehicle. In turn this may change the EV or vehicle count of one or more subsequent time periods for that location or direction of travel.

In a case the signal 344A at the junction A is green and the vehicle R1 does not have to slow or stop then EVA2 and EVB2 may occur sooner on the time horizon TH.

The TMS 101 may take an action based on calculations to determine relative distance or position of the vehicle R1 to a location of interest, and may vary size and placement of approaches or detection locations (geofences), such as in response to conditions, TOD/DOW, vehicle priority (VSS) or group priority (GSS), or if a user route is known.

The junction A2 may have a non-zero EVA2 in an eastbound direction as a result of the presence of the vehicle R1. Further, the junction A2 may have a sum of one or more EVs, in a direction approaching the junction A2 for at least one time period.

Each direction approaching a junction may have a weighted sum of EV on a time series, such as time periods from t1 to tn. A directional demand profile may be created by plotting these series of weighted sums of EV, and the plots may shift in time and magnitude to reflect traffic movements and phase changes. EV of each time period may increase as probability increases.

Demand may be additive and/or cumulative from multiple sources and users. Metrics may be in the form of a traffic count, whether from vehicles, bicycles, scooters, pedestrians and such. Directional demand from different directions or phases of traffic may be compared to determine a traffic signal timing plan (or other actuation) to prioritize an operating mode to meet a selected objective.

If a saturated traffic condition is reached, the TMS 101 may adjust signal timing, limit inflows into an area, and reroute traffic in an effort to minimize delay and congestion. The saturated traffic condition may be considered to be in effect in a case there is a sustained presence of a green traffic signal in a direction of travel but vehicles or users in the direction of travel are not able to achieve a minimum velocity or within a range of a target velocity.

An objective may be to obtain EVs from each available data source and process the data into a standard form for the purpose of performing further calculations. Individual vehicle EVs may help to inform the EV for particular locations or junctions on a route of the vehicle R1. A sum of EV of multiple vehicles and the sum of EV from other sources may be the total EV for a direction of each location or junction.

The closer the vehicle R1 is to the second location D2, the higher the EV of the vehicle R1 relative to the second location D2 may be. Certain locations and directions may have higher or lower EV than other locations or directions. For example, a left turn lane may have only one direction while another lane may have straight and right turn directions combined and may have a higher combined EV than the left turn lane as a result.

In a case a traffic signal controller (TSC) is configured to respond to inputs immediately, such as in a free mode, a detector card (DC) may be used to provide the TSC with requests and the TSC may respond such that the DC may effectively operate as the TSC. If the DC is connected to another source of requests, for example, an external device, system or algorithms, and configured to serve as a conduit for the other source then the other source may effectively operate as the TSC.

In a case the TSC is configured to respond to inputs while operating to a timing plan, the DC may be used to provide the TSC with requests that may be implemented by the TSC with a time delay from zero to some time period, such as up to a maximum green time, a maximum green time plus change time, or a time horizon.

The TMS 101 may be configured to receive status or SPaT data from the TSC about one or more phases, such as whether a phase is in a green, yellow, or red status, displaying a walk, or don't walk signal, a pedestrian countdown, a railroad signal, a bicycle signal, or other traffic control or indication signal. The TMS 101 may receive further information such as a duration or time component for the status of any of such present or subsequent signals or indications, and may use that information to further formulate next actions. Using directional demand calculations, the TMS 101 may select a strategy by which to request or control signal phase changes of the TSC.

Each signalized junction may have a variety of phase sets, meaning a concurrent combination of possible non-conflicting phases. Signal phase cycles (cycle) may include all or part of the set of possible phase sets. Phase sets may occur in a fixed order or flexible order.

A fixed order may be a cycle that includes two or more phase sets operating in a particular sequence where operation of a first phase set always precedes operation of a second phase set, generally with at least a minimum time duration for each phase set.

A flex order may be a cycle that includes two or more phase sets that may operate in more than one sequence. It may also operate similarly to a fixed order cycle except that the minimum time duration of at least one phase set may be zero, allowing that phase set to effectively be skipped and changing the order of phases, without constraint on which phase set must come before another phase set.

A phase set may include two or more non-conflicting phases of the junction that may operate concurrently. A sum of directional demand of two or more non-conflicting phases of the junction that may operate concurrently may be determined. For example, a junction may have a northbound expected value EVN (such as phase 8) and a southbound expected value EVS (such as phase 4) as a phase set since their travel directions do not conflict and may operate at the same time.

Figure 5A:
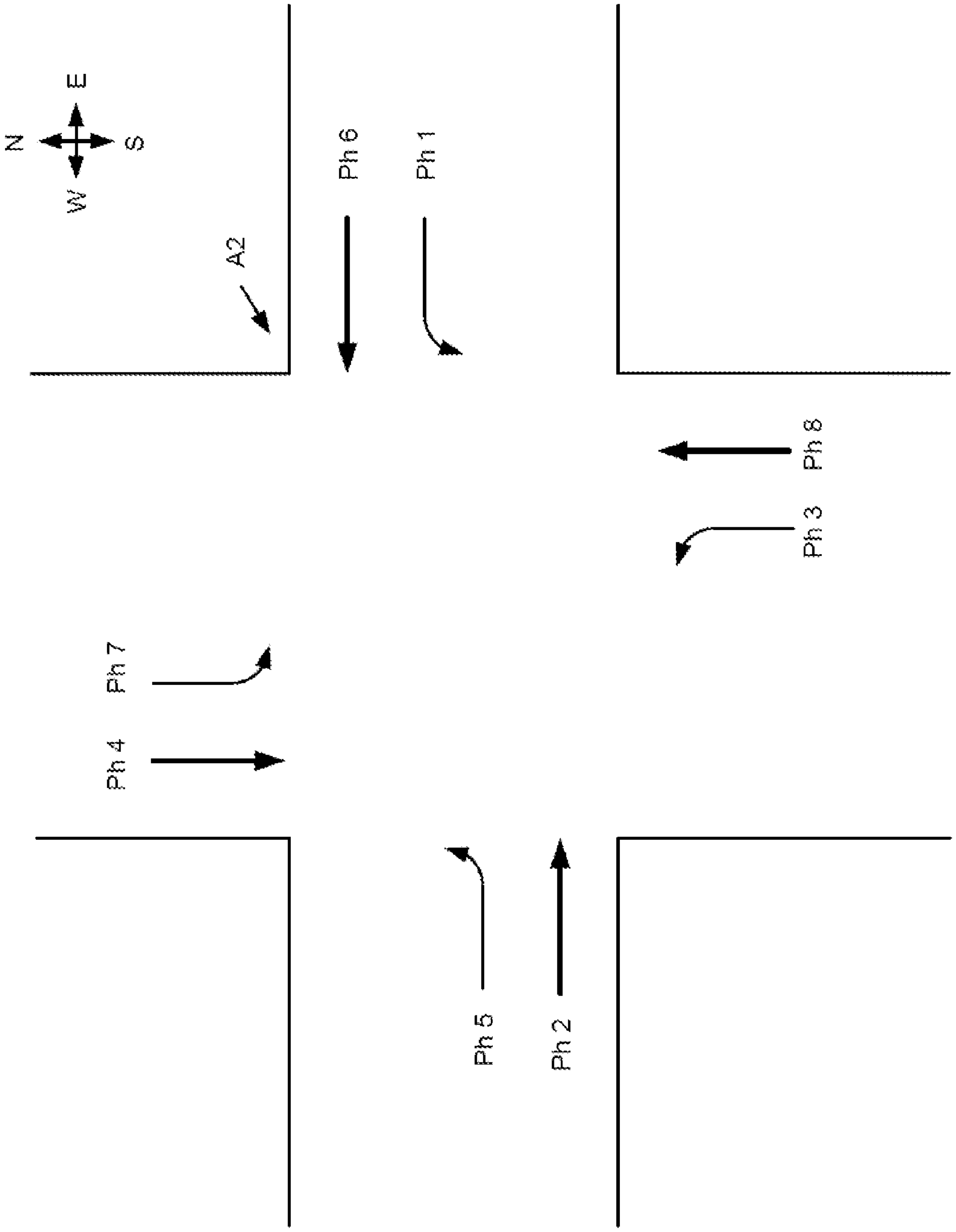
FIG. 5A is a diagram of a four way junction A2 having assorted traffic phases, according to one example.

FIG. 5A is a diagram of a four way junction A2 having assorted traffic phases, according to one example. In one case the west bound left turn direction may be assigned as phase 1. The east bound through direction may be assigned as phase 2. The north bound left turn direction may be assigned as phase 3. The south bound through direction may be assigned as phase 4. The east bound left turn direction may be assigned as phase 5. The west bound through direction may be assigned as phase 6. The south bound left turn direction may be assigned as phase 7. The north bound through direction may be assigned as phase 8.

Thus the non-conflicting phase sets in this case that may operate simultaneously include phase set (1,5), which includes phases 1 and 5, phase set (2,6), phase set (3,7), and phase set (4,8). Other simultaneous phase sets may also be possible, such as a phase sets (1,6), q(2,5), (3,8), (4,7) and so on depending on directions allowed at the junction A2.

Figure 5B:
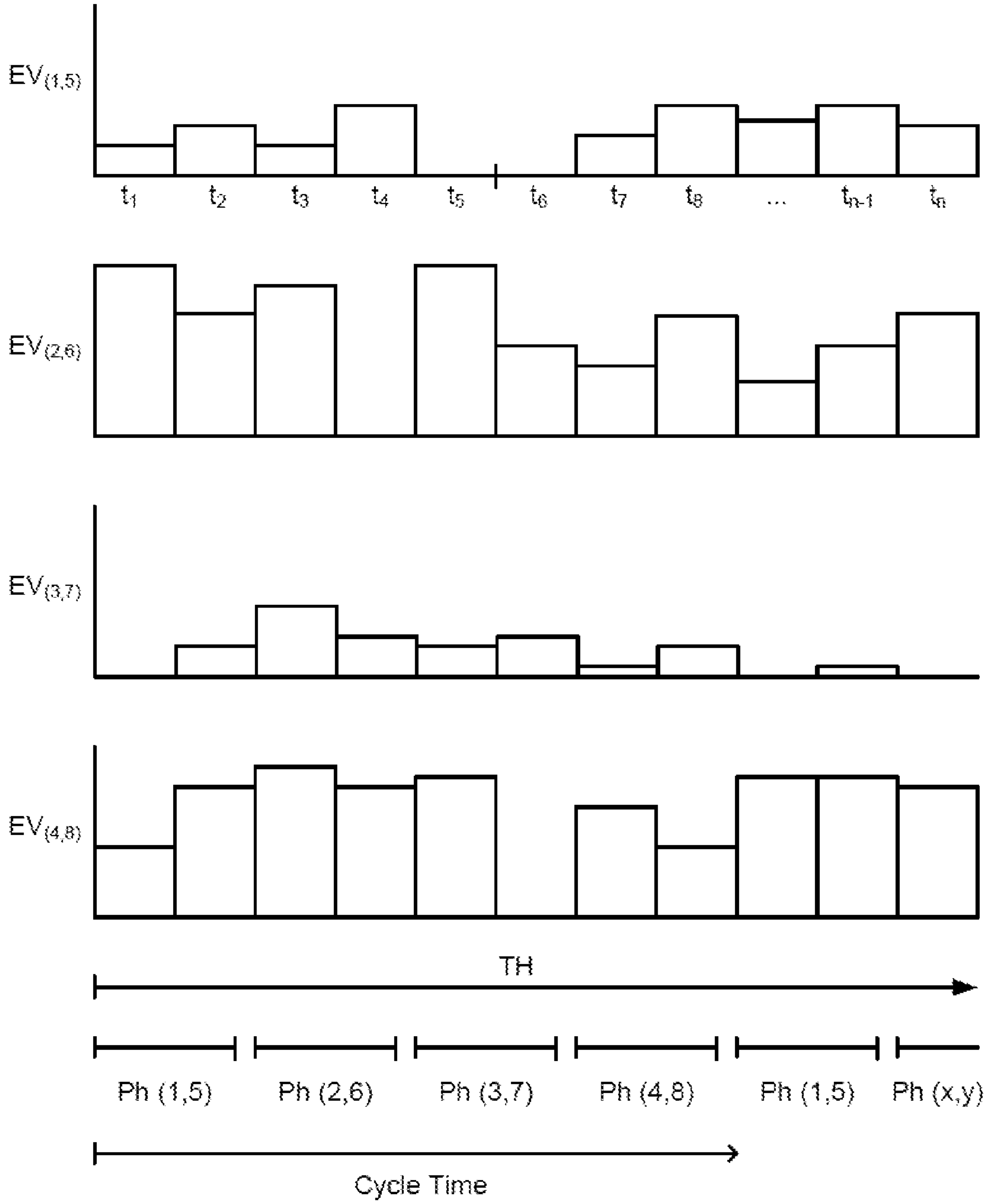
FIG. 5B includes a graph of exemplary directional demand for each phase set, in the form of EVs with respect to a location (such as the junction A2), during a time horizon TH.

FIG. 5B includes a graph of exemplary directional demand for each phase set, in the form of EVs with respect to a location (such as the junction A2), during a time horizon TH. The time horizon TH may be divided over a number of time periods of some duration, for example t1 to tn. The expected value for each phase set during each time period may include the EV of each phase of the phase set. For example, EV(1,5) during time period t1 may be a sum of an EV of phase 1 and phase 5 during the time period t1.

The TMS 101 may evaluate the EV of each phase set during one or more time periods, up to a maximum such as the time horizon TH, to determine timing for one or more upcoming phase sets during a period of time, such as up to the horizon TH. Lines shown below the time horizon TH represent green time of indicated phase sets. Green time for each phase may range from a green time minimum to a green time maximum of the respective phase set. Horizontal spaces between the phase sets on the time horizon may represent time while all the signals of the junction A2 are in a red state, or change time tCH between phase sets during which signals are yellow or red.

Expected values of traffic approaching the junction A2 from different phase sets may be compared, such as between two or more phase sets. For example, EV of a first phase or phase set (e.g. 2,6) may be compared to that of a second phase or phase set (e.g. 4,8) for a time period t1. This may be indicated by EVA2(Ph(2,6))[t1] vs. EVA2(Ph(4,8))[t1].

Further, these quantities may be compared over more than one time period, such as over the time period t1 and a subsequent time period t2. For example, a sum EV(Ph(2,6))[t1]+EV(Ph(2,6))[t2] may be compared to EV(Ph(4,8))

[t1]+EV(Ph(4,8))[t2]. A sum of comparison time periods may be at least equal to a minimum green time duration for one or more phases contemplated in the comparison. Alternatively, the sum of comparison time periods may be at least equal to the minimum green time duration of one or more phases of a phase set contemplated in the comparison.

Various types of scenarios may be evaluated by the system to determine optimal phase timing for a time horizon. This process may adjust durations of each of the phase sets to maximize total EV that may pass through one or more directions of the junction A2, or as part of a group of junctions, during a series of one or more time periods, provided constraints are met. The TMS 101 may evaluate multiple possible scenarios and select a timing plan that is estimated to be about optimal for the time horizon.

During a time horizon TH, traffic relative to a specific location, such as approaching one or more directions of the junction A2, may be operating in several conditions including free flow (such as moving without notable delay), stopped or queuing (such as due to a red signal or other delay), or discharging from a queue (such as after a traffic signal turns green or leaving some delay).

This process may be used with actual or approximate vehicle counts, with EV, or another metric for estimating a quantity or relative volume of traffic. Graphs do not necessarily indicate actual traffic or vehicle counts proportionally but may rather indicate relative significance of traffic or vehicles in terms of priority, confidence, or some combination.

Further, time from present may be a weighted factor, such as traffic that is expected to arrive during an earlier time period may be weighted differently than that expected to arrive during a later time period. When plotted these graphs may or may not be proportionate to an actual number of vehicles represented.

Figure 6A:
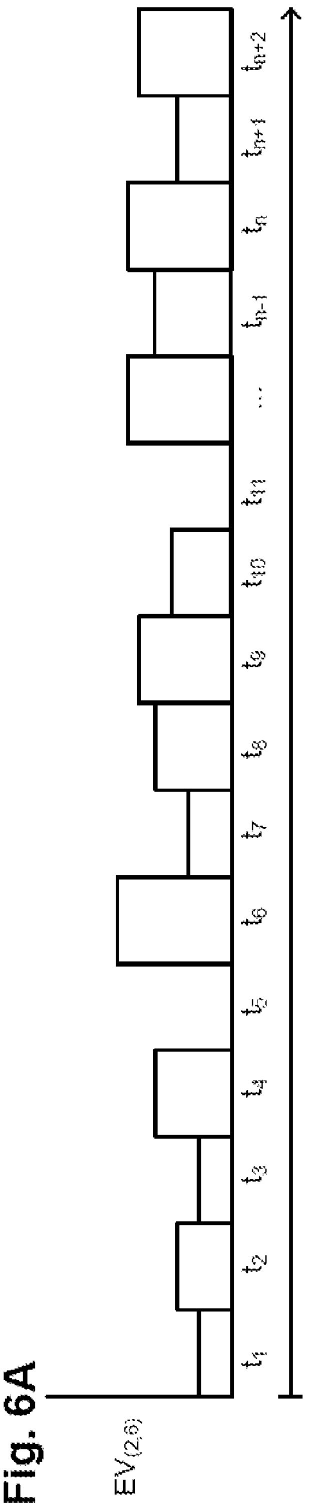
FIG. 6A is an exemplary graph of traffic in a free flow or steady state condition, such as in a case there is little or no delay, and traffic may be detected or estimated to be moving at speed (e.g. speed limit or another relatively constant speed) during all or part of a time horizon TH, according to one example.

FIG. 6A is an exemplary graph of traffic in a free flow or steady state condition, such as in a case there is little or no delay, and traffic may be detected or estimated to be moving at speed (e.g. speed limit or another relatively constant speed) during all or part of a time horizon TH, according to one example.

Each time period may have a total EV based on the sum of EV of each vehicle or user expected to arrive at and/or pass through a location, such as for a phase or phase set of the junction A2, during about that time period. A time period may presently also have no traffic estimated or expected, such as shown by the time periods t5 and t11.

A vertical axis of the graph may also serve as an indicator or measure of capacity utilization. If the indicator shows vehicle count or EV exceeds a saturation threshold S (also shown in FIG. 8) for a present condition then traffic may be congested. However, the threshold may be different if EV encompasses vehicle or user priority compared with an indication of vehicle counts, as vehicle counts may be more directly proportional to occupancy of physical space than EV, and therefore traffic congestion.

Cumulative EV for a time period may fluctuate based on a variety of factors, including a number of vehicles per user, priorities (e.g. VSS and/or GSS), and confidence in vehicle or user arrival at a location during a time period. Further, such confidence may be weighted in a non-linear fashion. For example, confidence of arrival time during time periods occurring sooner may be weighted to count more than confidence during later time periods.

In one case, an EV of a time period tn may be weighted more heavily than an EV of a time period tn+1 or tn+10. In another case, an EV of the time period tn may be weighted more heavily than that of a time period tn+1 which would in turn also be weighted more heavily than that of a time period tn+2.

A relationship for a vehicle or user to arrive at the junction A2 during free flow may be established using an equation x=vt (where x is a distance from the vehicle's present location to the junction A2; v is a dynamic or present velocity or speed of the vehicle; and t may be a time until arrival at the junction A2 tETA).

In one case, an approximate time or time range for the vehicle or user to arrive at a location at free flow may be calculated by t=x/v. Since x and v may be known, measured or estimated, a vehicle or user (and its corresponding EV) may be estimated to arrive at the location within one or more time periods, and a count or EV of those time periods may be calculated accordingly.

In another case, an average velocity for the vehicle or user needed to arrive at a location during a time period to may be calculated by v=x/t if an approximate distance from the location is known or estimated, and a desired time period or duration of travel from the location is chosen.

Further, since a given time period may have a known duration, and if x may be determined or assumed, then a v may be calculated to determine how fast a vehicle or user should travel to arrive at the location during the time period.

Total free flow traffic throughput for a phase or phase set for one or more time periods may be estimated as the sum of the EV of each of the time periods considered.

Figure 6B:
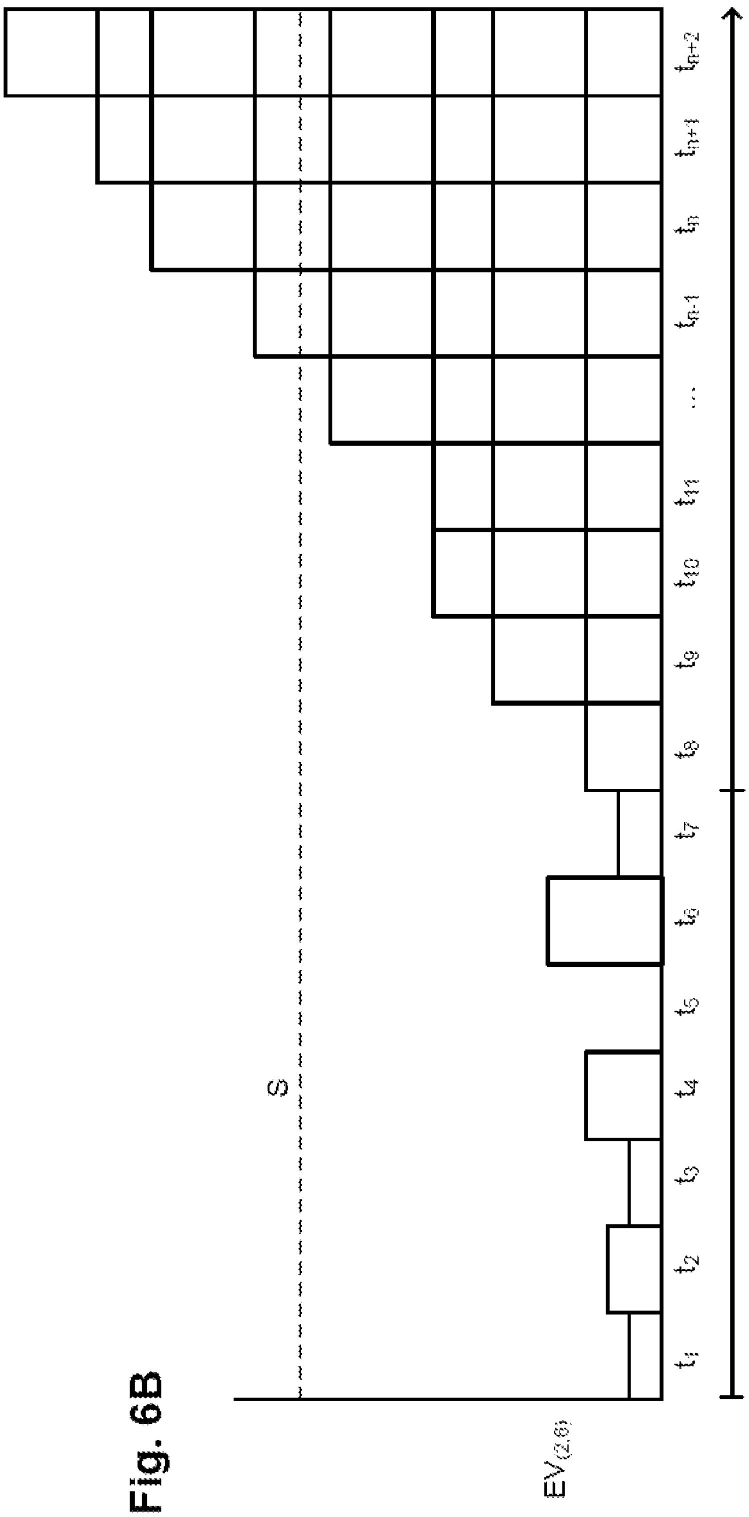
FIG. 6B is an exemplary graph of traffic queuing, such as for a red signal, beginning at a time period t8 based on free flow traffic shown in FIG. 6A, according one example.

FIG. 6B is an exemplary graph of traffic queuing, such as for a red signal, beginning at a time period t8 based on free flow traffic shown in FIG. 6A, according one example. Some or all of the EV during the red signal phase for a direction of travel may continue to remain in later time periods as some or all traffic may not proceed through the junction during a time period while the traffic signal is red in that phase or phase set (direction of travel). Some EV and counts may not remain in subsequent time periods such as that of vehicles or users that may turn on red. Further, EV may arrive at the junction A2 at varying rates and in a non-uniform manner with respect to time of arrival.

Stopped phases (all phases besides green or through phases) may incrementally accumulate EV while a red signal is displayed and traffic is stopped in those directions while additional traffic may continue to arrive in those stopped directions. Queue build up in stopped phases may increase EV in those phases for subsequent time periods, altering later comparisons of EV between phases or phase sets contemplated. Further, an order in which total EV may accumulate for a phase may be based upon an order of arrival, upon which an order of discharge may also be based (described further by FIG. 8). To calculate EV of queuing traffic, the TMS 101 may determine during which time period or periods a vehicle may likely arrive at the junction (or other point of interest), such as by using the above processes. Then the EV of that vehicle (or user) may also be added to that of each subsequent time period until that direction of travel has a green signal and traffic may begin and/or that particular vehicle is discharged, or until a particular EV of traffic is estimated to be discharged.

In a case the traffic signal has a green status during or after arrival of the particular EV then the particular EV may be added to an existing sum of EVs for the time period in question. While a traffic signal may not be red there may still be queuing of traffic in a direction of travel due to a constriction in traffic flow such as due to presence of a work zone, an accident, or other obstruction, or queued traffic ahead has not yet sufficiently discharged from the junction.

Figure 6C:
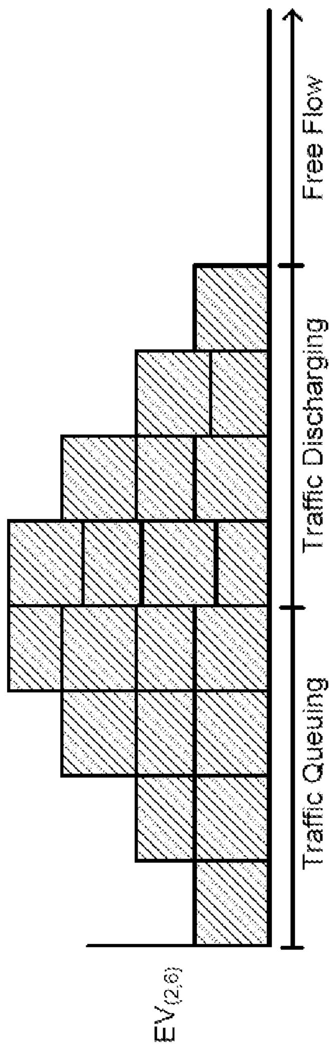
FIG. 6C is an exemplary graph of traffic (e.g. vehicle counts or EVs) queuing and discharging from a location, such as after a red traffic signal turns green and traffic begins to move, and then eventually reaching a free flow condition.

FIG. 6C is an exemplary graph of traffic (e.g. vehicle counts or EVs) queuing and discharging from a location, such as after a red traffic signal turns green and traffic begins to move, and then eventually reaching a free flow condition. If the timeline in FIG. 6B had been extended beyond a time period tn+2, traffic from a time period tn+3 and beyond may also have displayed a similar change of condition.

Accumulated traffic may begin to discharge from a queue and subsequent time periods may see total EV decrease relative to the total EV of a previous time period, as traffic begins to move through the junction A2 from that phase or phase set.

The EV of a particular vehicle may be included in more than one time period such as in a first time period followed by inclusion in other, subsequent time periods after the signal has changed from red to green, depending on a rate traffic is discharging according to discharge processes described below.

In one case, total non-free flow traffic throughput of a junction, or a phase or phase set for one or more time periods may be calculated as the sum of EV of discharge traffic and free flow traffic throughput for up to a number of time periods. The number of time periods may include time periods the signal is green, time periods the signal is red, or include time periods during which the phase or phase set may have more than one signal status.

Once queued traffic previously located at a junction or site of delay is sufficiently discharged from the junction (such as a case that traffic has left the junction or site of delay and accelerated up to a free flow speed), traffic that is following and approaching the junction may do so in an approximately free flow condition, not having to either decelerate or accelerate due to queued traffic or obstructions.

Once the red signal turns green, or an obstruction is removed, there may be at least one rate from which accumulated traffic discharges from that phase of the junction A2 based on a number of vehicles or users present, and variability with time by which the vehicles or users may each leave the intersection.

One or more discharge rates may be observed or estimated to be in effect for that phase or phase set until traffic returns to a free flow condition in that direction. Queue clearance time may vary and be counted from a time the traffic signal for the phase turns green until a final vehicle or EV stopped or delayed by the phase has approximately reached a target speed or velocity considered to be that of a free flow condition.

Traffic flow for a phase or phase set may be assumed to have changed to free flow in certain conditions such as in a case there is no accumulated EV in a present time period to that is left from a previous time period tn−1, or one, some or all vehicles on a road segment, approach, or within an area are moving within a certain range of an average velocity (e.g. 80%, 90%, 100% or more).

As a stopped phase changes to green a discharge rate, such as of EVs (or vehicle or user count), of that phase through the junction A2 may be detected or assumed. In one case, the discharge rate may be based at least partly on an estimate of accumulated EVs leaving the junction A2 in an order that corresponds to an order of arrival at the junction A2. In another case, the discharge rate may be determined at least partly through detection on an exit of the junction A2 of a user's EV and/or a vehicle count.

A vehicle count may decrease at a linear rate (such as by a value of 0.25 to 5.0 per second) or a non-linear rate (such as increasing or decreasing as a function of time, from a time the junction A2 begins to discharge traffic), to estimate the accumulated EV of a phase discharging over time as traffic of that phase passes through the junction A2 until that traffic of that phase may be considered to have reached a free flow rate.

The EV discharge rate of a phase of the junction may also vary due to a variety of factors, including geographical, topographical, or ambient conditions. For example, an uphill road segment or inclement weather may result in a slower discharge rate as traffic may tend to accelerate more slowly, while a downhill road segment during dry conditions may allow traffic to accelerate more quickly. Rates may also be assigned per known vehicle or user based on past performance of the known vehicle or user.

Figure 6D:
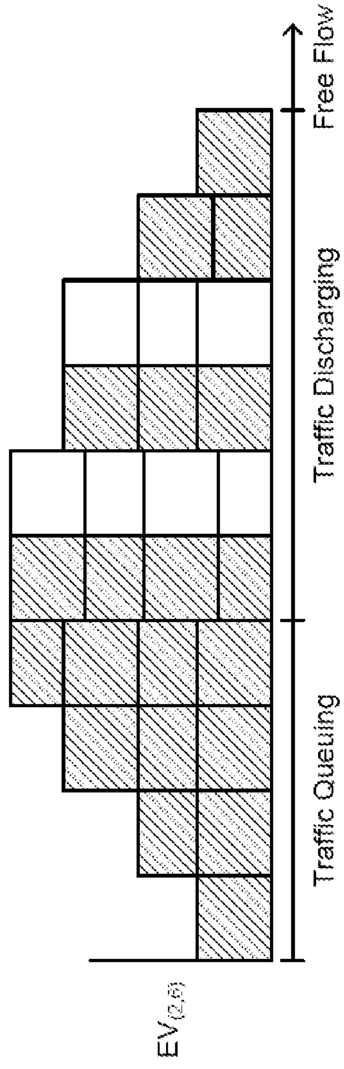
FIG. 6D is an exemplary graph of traffic discharging from a location, such as after a red traffic signal turns green as in FIG. 6C.

FIG. 6D is an exemplary graph of traffic discharging from a location, such as after a red traffic signal turns green as in FIG. 6C. However, while EV is shown in FIG. 6C as discharging symmetrically with traffic queuing shown in FIG. 6B, a discharge rate may be different from a queuing rate as rates of deceleration during queuing and acceleration during discharge may be different for both individual vehicles and for groups of vehicles traveling together in the same direction.

The unhatched boxes represent EV of vehicles or users as in FIGS. 6A-6C. The hatched boxes are duplicates of adjacent unhatched boxes in one or more previous, consecutive time periods. The hatched boxes represent EVs that have not moved despite a green traffic signal.

This may occur for a number of reasons including a normal or delayed response time by a user (driver) or vehicle to begin driving, whether because of distraction, a vehicle problem, or other obstruction. Some or all vehicles or users following behind the user or vehicle that is slow to respond may then also be delayed.

Duration of delay may be estimated by a variety of factors inherent to the location such as line of sight, ambient conditions, gradient, delay by a vehicle or event ahead, time of day or day of the week, and so on.

Duration of delay may also be due to a particular driver or user, and can be estimated based on past data specific to the location and/or the particular user, driver or vehicle.

Figure 7:
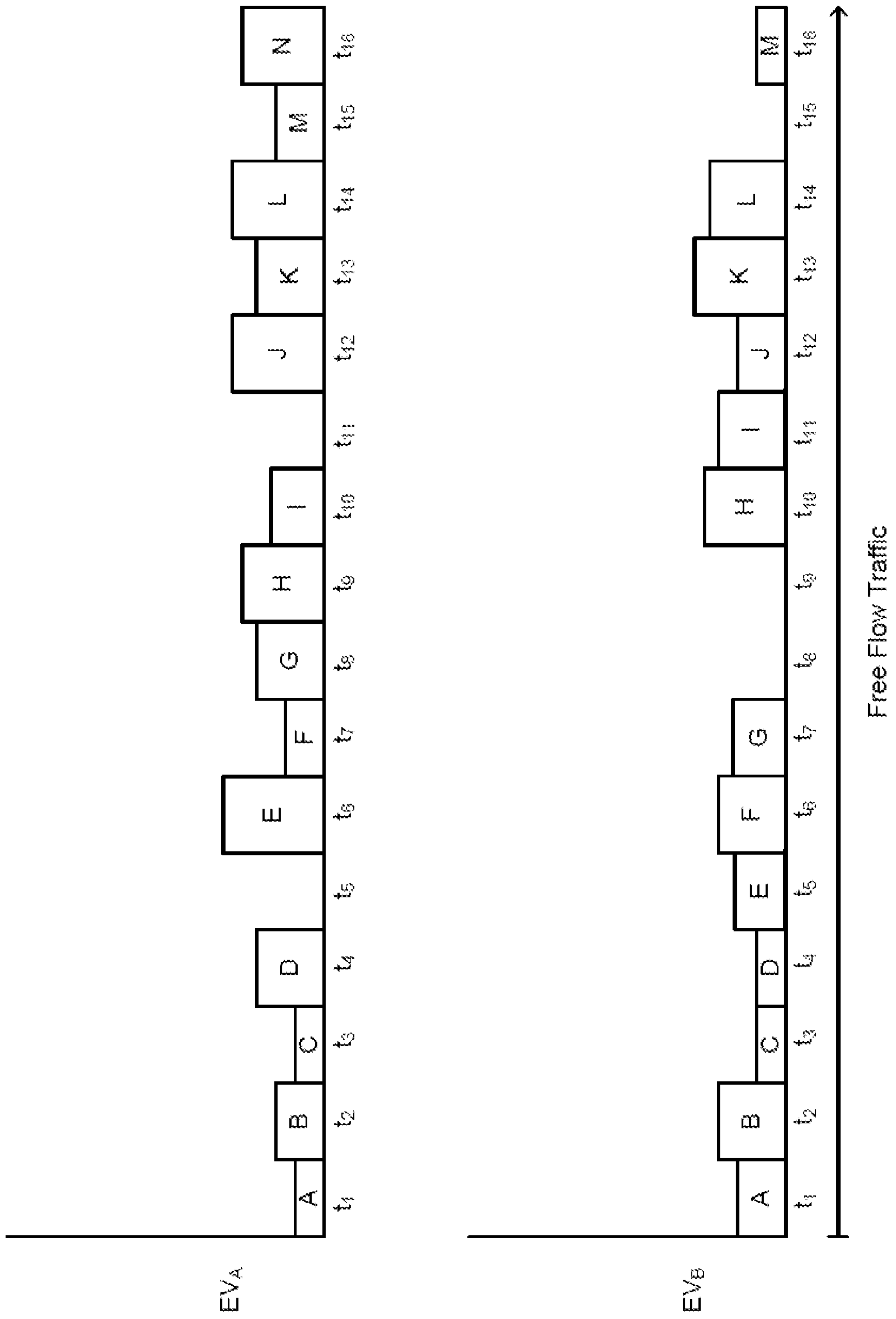
FIG. 7 is an exemplary graph of EVs of separate phase sets approaching the junction A2 in a free flow condition, a phase set A (such as having phases 2 and 6 as shown by FIG. 5) and a phase set B (such as having phases 4 and 8 as shown by FIG. 5) during a series of consecutive time periods t1 to t16 that may form part or all of the time horizon TH.

FIG. 7 is an exemplary graph of EVs of separate phase sets approaching of the junction A2 in a free flow condition, a phase set A (such as having phases 2 and 6 as shown by FIG. 5) and a phase set B (such as having phases 4 and 8 as shown by FIG. 5) during a series of consecutive time periods t1 to t16 that may form part or all of the time horizon TH.

Each time period of the phase set A and of the phase set B may have an EV, such as the EVA through EVN (shown as A through N) for the phase set A, and EVA through EVL (shown as A through L) for the phase set B.

Estimated EV of the phase set A and that of the phase set B may be used as a baseline by which to compare and determine an optimal throughput for time period(s) under consideration. A trade off to keep traffic flowing in the phase set A is the delay of slowing or stopping traffic traveling in the phase set B. Since the phase set A and the phase set B may not concurrently both be green if they contain conflicting directions, an estimate of traffic throughput of the phase set B may need to be calculated from a baseline free flow rate of traffic of the phase set B to represent potential or probable throughput when traffic of the second phase or phase set B is subject to a non-free flow condition.

Figure 8:
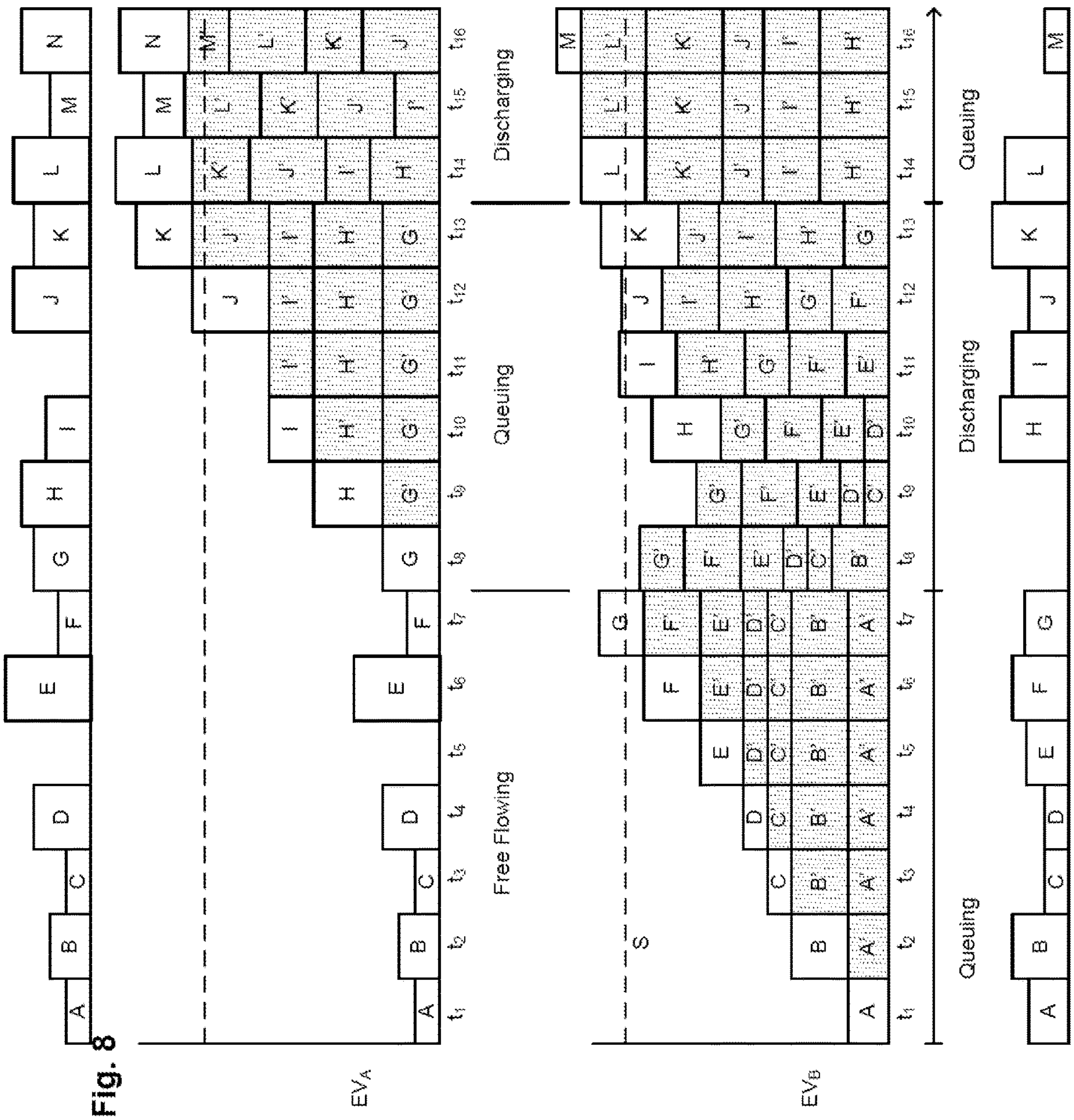
FIG. 8 is a graph of the EVs of the phase set A and the phase set B from FIG. 7, each phase set shown alternating between a partly free-flow condition and a partly non-free flow condition such that traffic from the phase set A and the phase set B may alternate moving through the junction A2 in a non-conflicting manner, according to one example.

FIG. 8 is a graph of the EVs of the phase set A and the phase set B from FIG. 7, each phase set shown alternating between a partly free-flow condition and a partly non-free flow condition such that traffic from the phase set A and the phase set B may alternate moving through the junction A2 in a non-conflicting manner, according to one example.

From time periods t1 through t7, the phase set A may be in a free-flow condition (e.g. the traffic signal in the direction(s) of travel of the phase set A may be green and traffic is moving) while the traffic signal of phase set B may not be green and traffic is queuing. From time periods t8 through t13, the phase set A may not be green and traffic may be queuing while the phase set B may be green and traffic is discharging. From time periods t14 through t16, the phase set A may be green and traffic is discharging while the phase set B may not be green and traffic is queuing.

EVA through EVN of the phase set A may be assigned to different time periods than those shown in FIG. 7, or may be shown to be delayed, due to conditions changing such as by changes to conditions of the individual vehicles or users, or by changes to a traffic signal status for the phase set A. The same may be true for EVA through EVL of the phase set B.

For example, the EVA through EVF for the phase set A may be the same for the time periods t1 through t7 in FIG. 7 and FIG. 8. However, because in FIG. 8 phase set A is not green for time periods t8 through t13, EVG through EVK are estimated to remain at the location of junction A2 during at least those time periods and resulting in a queue.

Each of the EV values that is delayed from passing through a location, such as the junction A2, during its time period shown in FIG. 7 to one or more subsequent time periods is indicated by a prime notation ('), such as G', H', I', and J', during the time periods it is delayed.

Some or all of the vehicle(s) and user(s) representing the value EVG may be in a free flow condition during time period t8 in FIG. 7, and not delayed such that they may not be counted in subsequent time periods. However, during the time period t8 in FIG. 8 the traffic signal status for the phase set A is not green and some or all of the vehicle(s) and user(s) representing the value EVG may be delayed at least through the time period t13. So EVG (shown as Gin time period t8) is repeated as G' for subsequent time periods t9 through t13. As shown, the same may occur for EVH through EVM during some time periods subsequent to the time period t9 for the phase set A, as indicated by H', I', J', K', L', and M', respectively. A total EV for a time period may be represented by a sum of all the component EV for the time period, including values indicated by a prime notation. This may be the case regardless of the signal status.

The EVs L' and M' may represent a different case in that EVs of L and M may arrive at the location during the time periods t14 and t15, respectively, while the signal status of the phase set A may have returned to green. However, because traffic queued during the time periods t8 through t13 is not expected to be fully discharged from the junction A2 by then, at least one travel direction of the phase set A may not yet be in a free flow condition due to a queue delay. The EVs L' and M' may thus subsequently occur in the time periods t15 and t16 even though queues for those time periods have begun to clear for the phase set A. This is indicated by the lack of EVs G' and H' during and after the time periods t14 and t15, respectively, as the users associated with those EVs may have cleared the location.

Correspondingly, if the phase set A and the phase set B are conflicting phase sets then they cannot concurrently operate with a green signal phase. In this case, the EVA through EVG for the phase set B is not the same for the time periods t1 through t7 in FIG. 7 and FIG. 8. This is because in FIG. 8 at least one signal status for the phase set B is not green, resulting in the converse of the situation of phase set A for those time periods.

Each of the EVA through EVG shown in a free flow condition in FIG. 7 may be delayed in FIG. 8 from passing through the location during its respective time period t1 through t7 to one or more subsequent time periods. This may be indicated by a prime notation ('), such as A', B', C', D', E', F', and G' during the time periods an EV is delayed.

Time periods t8 through t13 may indicate at least one signal status for the phase set B is green and queued traffic may be discharging from the location, analogous to activity described for time periods t14 through 16 of the phase set A.

Time periods t14 through t16 may indicate at least one signal status for the phase set B is not green and traffic is queuing, analogous to activity described for time periods t8 through t13 of the phase set A.

In one case, a phase with a green signal status may be considered to have transitioned from a queue discharging condition to a free flow condition once some or all queued EVs from one or more previous time periods are no longer determined to be at the location during a present or certain previous number of time periods.

In another case, a phase may be considered to be operating in a free flow condition if an average speed of one or more users approaching or passing through the junction A2 within a time period, such as a present or a certain previous number of time periods, may be determined to be at or above a target velocity (e.g. at least within 20% of a fixed or a present (dynamic) speed limit).

Rates of queuing and discharging for each phase or phase set may be non-symmetrical in that traffic may accumulate at a different rate than it discharges. Also, cumulative EV of a time period of a phase or phase set may not be purely cumulative from one time period to the next due to changes in detected behaviors or paths of one or more vehicles or users that form a portion of the total cumulative EV for the phase or phase set, such as may occur in a case a vehicle turns off of a road segment and parks. The EV of the vehicle may then be considered about zero and may not be counted in a subsequent time period.

In another case, the junction A2 may have more than two phase sets to consider. For example, the junction A2 may have three, four or more non-concurrent phase sets.

In another case, traffic may queue faster than it discharges. As traffic is subject to a non-free flow condition, such as for one or more phases of phase set B between time periods t8 and t13, the EVs queue and accumulate in a particular phase or phase set, which may prevent the phase or phase set from reaching a free flow condition due to a persistent queue, even if the vehicles or users of the persistent queue are not constant.

Further, there may be a partly free flow condition of separate phase sets of the junction A2, a phase set A and a phase set B during a series of consecutive time periods t1 to t16 that may form part or all of the time horizon TH.

In a case the phase set A is green and the phase set B is red then the phase set A may have uninterrupted free flow movement, and throughput for the phase set A may be determined as described by FIG. 6A. Throughput for the phase set B may be determined as described by FIG. 6B-6D, where EV throughput of the phase set B may have a delay occurring during one or more time periods. This delay may include an estimate of EV queuing in the phase set B until the phase set B is green (whereupon phase set A is already in red and queuing) and queued traffic may begin to discharge in the phase set B. If there is sufficient green time during the phase set B to allow queued traffic to be fully discharged then traffic may return to a free flow condition afterward.

If the phase set A and the phase set B are only compared for one cycle where the phase set A is operating and the phase set B is stopped, then total throughput for the junction may be approximately the throughput of the phase set A. However, if the comparison is for more than one cycle, such as in a case the time horizon is greater than one cycle, then both the phase sets A and B may each be green for a portion of the time horizon and provide throughput, albeit during non-concurrent time periods.

If traffic has to slow or stop then a delay may be introduced based on time components from stopping, waiting, and accelerating back to a free flow condition. A sum of the EVs of those time periods may provide an indication or estimate of delay.

A queue discharge rate or calculation may be estimated for a phase changing from red to green with known EVs or vehicle counts waiting. A variety of comparisons may be made between estimated EVs of phases or phase sets, including comparing from about a minimum green time period up to about a maximum green time period for a current and immediate next phase set of a current cycle. In one case estimated EVs may be compared from about a minimum green time period up to about a maximum green time period for a current and next n phase sets of a current cycle. In another case, estimated EVs may be compared from about a minimum green time period up to about a maximum green time period for a current and next n phase sets of a current and next cycle. In another case, estimated EVs may be compared from about a minimum green time period up to about a maximum green time period for a current and next n phase sets of a current and next cycles up to about a time horizon period.

The TMS 101 may determine a minimum difference in estimated throughput of EVs between a first phase set and a second phase set to achieve a net increase in overall throughput. The TMS 101 may only institute this for one sequence of change (e.g. from main line to side street or left green signal but not vice versa, otherwise side street traffic may not clear for too long a time). Or the EV difference must be more than a certain amount and/or certain amount of time for the TMS 101 to do so.

In one example, each phase of the first phase set may have an equal change time from green to red, as does each phase of the second phase set. Change time tCH may be equal to yellow signal time in the first phase set plus all red signal time in each phase set. Change time tCH for the second phase set may be the same as for the first phase set if yellow time of the second phase set is equal to that of the first phase set, and the all red time may be the same between each phase sets.

In one case a sequence of phase sets, such as those described by FIG. 5A, in a cycle is fixed, each phase set has a minimum green time duration, and the duration of phase sets may be varied between the minimum green time and a maximum green time.

In one case, the sequence of phase sets in a cycle may be phase set (1,5), followed by phase set (2,6), phase set (3,7), and phase set (4,8).

Alternatively, the sequence of phase sets in the cycle may be phase set (2,6), followed by phase set (1,5), phase set (4,8), and phase set (3,7), or some other sequence of phase sets. A cycle may be defined as the traffic signals at the junction A2 operating through each phase set once, or without repeating any one phase set even though one or more phase sets may be omitted or skipped. Alternatively, a cycle may be defined as beginning or ending each time a specific phase or phase set has a green or a walk signal status. In yet another alternative, a cycle may be defined as a fixed time duration including more than one phase set operating in a green or walk signal status.

A change time tCH duration may be a time duration for a phase to change from a green light to a yellow light and then a red light, and may include a time before a red light in a next phase set changes to a green light, or an analogous pedestrian (e.g. walk, pedestrian countdown, don't walk signals) or bicyclist signal equivalent.

The change time tCH duration between one phase set and a subsequent phase set may be fixed for at least one timing plan. However, the change time tCH duration may vary among different phase sets (e.g. change time tCH duration between the phase set (1,5) and the phase set (2,6) may be of a different duration than change time tCH between the phase set (3,7) and the phase set (4,8)).

The cycle time may be at least a sum of a minimum green time for some or all of the phase sets in a cycle plus all the change time tCH following each of those phase sets. The cycle time may be up to a sum of the maximum green time for each phase set in a cycle plus all the change time tCH following each of those phase sets.

In one case, in an effort to maximize EV throughput of the junction A2 within a time horizon TH, the TMS 101 may determine a duration for each phase set by performing some or all of the following steps:

Summing EVs of an initial green time duration contemplated, such as a minimum green time period for the first phase set, of a first phase set (or phase) of the junction A2. The green time duration may include at least one time period tn, and may include additional subsequent time periods such that the sum of the time periods is at least equal to the minimum green time duration for the phase set contemplated.

Dividing the summed EV of the first phase set by the green time duration contemplated to determine a value of EV per unit of time, which may represent an estimated measure of potential traffic throughput of the junction A2 for the first phase set during that time period.

Summing EVs of the green time duration contemplated in a previous step, of at least one subsequent phase set (or phase) of the junction A2.

Dividing the summed EV of the second phase set(s) by the green time duration contemplated to determine a value of EV per unit of time, which may represent an estimated measure of potential traffic throughput through the junction A2 for the subsequent phase set(s) during the green time duration.

Comparing the summed EV of the first phase set with that of the subsequent phase set(s) to determine a possible maximum summed EV for the contemplated time duration.

Further, additional logic may be applied such as to one or more calculations to further refine decisions regarding phase selection and durations. For example, time periods that will occur sooner may be weighted more heavily than time periods that will occur later, or inclusion of one or more estimates in EV throughput reductions due to traffic queuing and discharge conditions that accompany signal phase changes of the junction A2, rather than a direct comparison of estimated EVs of phases or phase sets of more than one theoretical concurrent phase or phase set operating in a free flow condition.

Repeating the preceding steps for at least the first and the subsequent phase sets with an incremental additional time period, such as a time period beyond the minimum green time duration, up to a time period that may include the time horizon TH to determine a probable optimal throughput or outcome.

The system may repeat the preceding steps by equally incrementing potential green time duration for each of the first and subsequent phase sets in increments of some time duration, such as by the time period, up to the maximum green time duration for each phase set, up to the maximum green time duration of the phase set of the junction A2 with the shortest maximum green time duration, or up to the approximate time horizon TH.

In one case, the summed EVs of each phase or phase set over a time duration may be compared on a total EV basis with that of another phase or phase set for the same time duration(s).

In another case, the summed EV may be divided by the contemplated green time duration for each iteration so as to consider summed EV per unit of time. In other words, dividing the sum of EV of each phase set in a sequence of green phase sets up to about the time horizon TH by the time horizon TH may yield a measure of potential traffic throughput of the junction A2.

In another case, the summed EV may be divided by a number of lanes of each phase or phase set per iteration so as to consider summed EV per lane. Between the minimum and maximum green time of each phase there may be at least one duration that produces the highest traffic throughput or rate of traffic throughput among all phases contemplated through the junction A2 during the time horizon TH, or another desired outcome.

The TMS 101 may opt to select green phase set times and/or green cycle times that results in the highest EV per unit of time, or to meet another objective such as those described below provided applicable constraints are met, and then send a request to or actuate the appropriate traffic signals to effect the corresponding changes.

Stopped phases (all other phases besides green or through phases) may incrementally accumulate EV while red as traffic is stopped in those directions but additional traffic may continue to arrive in those directions. Queue build up in the stopped phases may increase EV in those phases for subsequent time periods, altering later comparisons of EV between phase sets contemplated.

As a stopped phase changes to green, an EV discharge rate of that phase through the junction A2 may be detected or assumed, such as by an approximation that the accumulated EV count or number of vehicles in the queue decreases by the second (such as by a value of one vehicle per between 1 and 10 seconds), that may allow the accumulated EV of that phase to be gradually discharged as traffic of that phase passes through the junction A2 until traffic in that phase may be considered to have reached a free flow condition. The EV discharge rate of a direction of a junction may also vary due to a variety of factors, including geographical, topographical, or ambient conditions.

Constraints may include the minimum and maximum green time durations of any phase set, a maximum red or non-green time for any phase set, a maximum or minimum cycle time, and/or that the time horizon TH is not exceeded. Additional constraints may include a minimum or maximum number of times a phase or phase set may be red or green within a time duration, a number of phase changes, or a number of cycles.

To more closely match actual conditions, the TMS 101 may also account for disruptions of changing phases while comparing phase set EVs in terms of reduction of traffic flow in the phases that are stopped, and in phases that turn green but have not yet reached free flow state due to queue clearance delays.

In one case, this may be accomplished by considering a reduced portion of EV throughput from the green phase where traffic may move more slowly than during free flow as traffic transitions from a stop to free flow.

Meanwhile stopped phases may accumulate EV as traffic (and therefore EV) is shifted to later time periods after those phases turn green again, while the time periods during which traffic is stopped may have EV throughput of approximately zero.

Due to interdependencies between time periods and EVs of phases, each iteration of the above steps may alter EVs of one or more phases during one or more of the time periods contemplated.

In one case, a first phase or phase set may have a green traffic signal status while a second phase or phase set may have a red traffic signal status. EV in the direction(s) of travel approaching the second phase or phase set may be shifted to one or more later time periods (e.g. tn, tn+1, etc.) while the second phase or phase set has a red traffic signal status.

The shifting of EVs of the second phase or phase set to later time periods may represent an estimate of when the EVs for the second phase or phase set may be expected to proceed through the junction A2. Further, this information may be combined with SPaT to increase confidence interval, for example, if an approximate time period that the second phase or phase set changes to a green signal status is known then the queued EV estimated to have accumulated in the second phase or phase set by that time period may be expected to begin discharging, such as at a rate as described by FIGS. 6C, 6D and 8.

In another case, EVs in the direction(s) of travel approaching the second phase or phase set may not be shifted to one or more later time periods and may continue to increase at a normal rate while the second phase or phase set has a red status. These may represent an estimate of the EVs that are queued to proceed through the junction A2 but have not yet done so due to the signal status in the second phase or phase set.

Figure 9A:
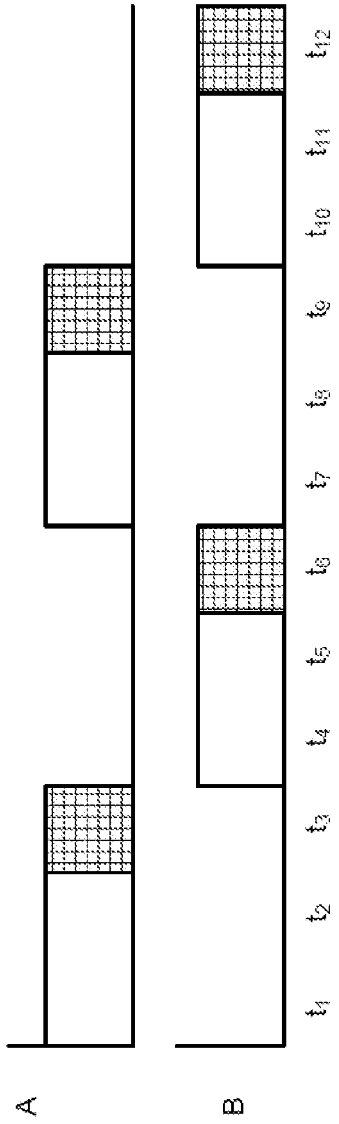
FIGS. 9A-9C each show exemplary graphs of a traffic signal status of a phase set A and a graph of a phase set B at the junction A2 during a time horizon TH of at least 12 time periods t1 through t12, the phase sets A and B alternating in their provisioning of a green traffic signal status.
Figure 9B:
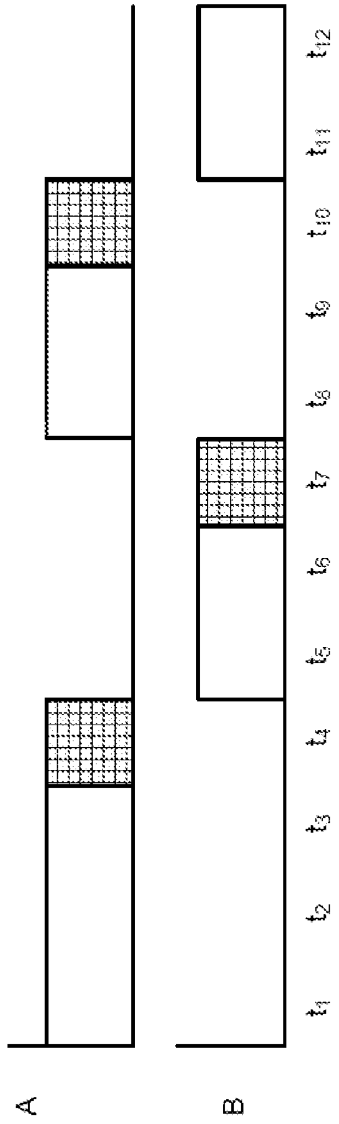
Figure 9C:
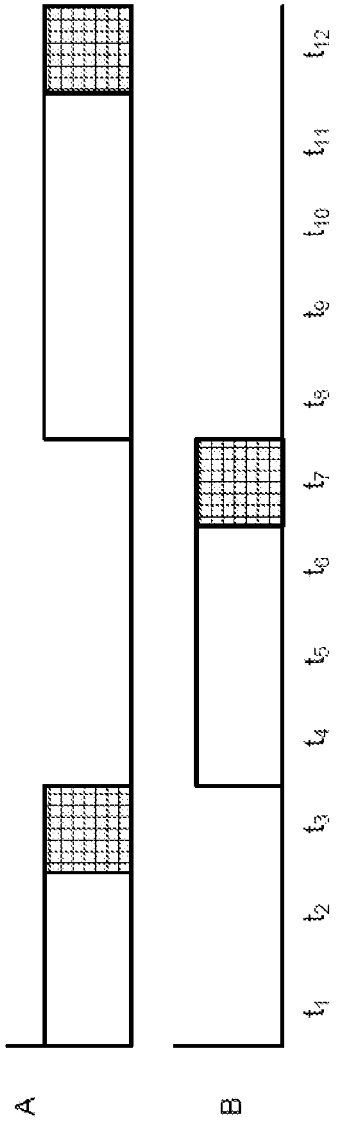

FIGS. 9A-9C each show exemplary graphs of a traffic signal status of a phase set A and a graph of a phase set B at the junction A2 during a time horizon TH of at least 12 time periods t1 through t12, the phase sets A and B alternating in their provisioning of a green traffic signal status. A vertical axis of each graph indicates whether the traffic signal status is green, yellow, or red.

Each portion of each graph shown with a flat baseline indicates a red signal status during those time periods. Each portion of each graph showing an empty rectangle indicates a green signal status during those time periods. Each portion of each graph showing a crosshatched rectangle indicates a yellow signal status during those time periods. A portion of the time periods having crosshatched rectangles may also represent a red signal status, such as when all directions of the junction A2 may be in a red signal status during signal phase changes.

For the duration of the time horizon TH, the junction A2 may be operating on two phase sets such as the phase set A (such as having phases 2 and 6) and the phase set B (such as having phases 4 and 8)—as shown by FIG. 5A. Such may be the case when no left turns are permitted in any direction approaching the junction A2 or left turns are permitted but must yield to oncoming traffic, and the phase set changes are between the phase set A and the phase set B.

The time horizon TH may have a number of time periods, depending on the duration of each time period. The signal status of the phase set A and the phase set B may be selected based on an estimated optimal throughput, for example of EV or vehicle counts, for the junction A2 for the duration of the time horizon TH.

In other words, a timing plan may be selected for all or part of the time horizon TH to optimize throughput, provided all constraints are met. The timing plan may be selected by evaluating or estimating a probable throughput for the junction A2 from a set of possible timing plans.

Constraints may include minimum and maximum green time durations of any phase set, a maximum red or non-green time for any phase set, a maximum or minimum cycle time, and/or that a sum of the time periods does not exceed the time horizon TH. Additional constraints may include a minimum or maximum number of times a phase or phase set may be red or green within a time duration, a number of phase changes, or a number of cycles. Durations considered for the phase set A and the phase set B may range from about their minimum green time up to about the maximum green time, respectively, in increments of the time period. Further, change time tCH may also be included.

For each incremental time period of the first phase set beyond its minimum green time, the system may consider changing to operating the second phase set for at least the minimum green time and up to a maximum green time of the second phase set in increments of the time period.

For a maximum number of phase changes to occur during the time horizon TH, each phase set would operate at its minimum green duration and then change to another phase set. For a minimum number of phase changes to occur during the time horizon TH, each phase set would operate up to its maximum green duration before changing to another phase set. There may exist a variety of combinations of phase set durations or scenarios for two or more phase sets between (and may be inclusive of) the minimum and/or maximum number of phase set changes.

If the time horizon TH is not met or exceeded by the sum of the first and second phase set green time duration (and possibly including change time for at least one of the phase sets and/or a red clearance time between the first and the second phase set in the sum of time) for a scenario evaluated by the system, then the system may continue the evaluation by reverting to the first phase set for some duration, or in some cases such as those involving more than two phase sets, evaluate a third phase set in a manner as described above (in this case proceeding to a subsequent cycle and returning to the first phase set).

This calculation may continue until a sum of the green time durations, or the sum of the green time durations plus durations of all red time, of all phase sets considered is at least equal to the time horizon TH. In doing so a variety of possible timing plans may be contemplated.

Each timing plan contemplated may be considered on the basis of optimizing throughput of EV or counts. Alternatively, timing plans may be considered on the basis of other metrics, such as for minimizing or increasing travel time for a type or group of vehicles or users.

In one case, only the EV of certain vehicles or users above or below an EV threshold, or within an EV range, or that otherwise meet certain criteria, such as by emergency status or passenger count, may be considered in calculations for timing plan selection. Further, vehicles or users may be considered individually or collectively.

In another case, EV or counts may be calculated on the basis of summing an estimated EV or count for each time period of a phase or phase set, and comparing the sum with the same for another phase or phase set to determine which may be prioritized.

In another case, before summing estimated EV or counts for a set of time periods of a phase or phase set, a calculation may be performed to estimate reductions in EV or count throughput of at least some of the time periods of the phase or phase set due to delay, such as queue discharge prior to traffic in the phase or phase set achieving a free flow state, if any. The greater the estimated reductions in EV or count throughput for each phase or phase set change, the fewer and further apart in terms of time periods the selected timing plan may be. This may help account for the calculation tradeoffs of how long to operate phases for, and when to change phases.

In one example, the junction A2 may have a two phase set cycle including the phase set A and the phase set B. Each time period may be 3 seconds. For each phase set the minimum green time may be 3 seconds, the yellow time may be 3 seconds, the maximum green time may be 21 seconds, and the all red clearance time may be zero. The time horizon TH may be 60 seconds. The shortest time a phase set may be active (green and yellow time) is then 6 seconds (3+3 seconds) while the maximum active time is 24 seconds (21+3 seconds).

During the time horizon TH, the first and second phase sets operating at minimum green durations may thus collectively change (i.e. total number of phase set changes) between phase sets up to nine times in between the start and end of the time horizon TH. The phase sets may collectively change at least twice while operating at maximum green durations within the same time horizon TH.

Other timing plans operating during the same time horizon TH with the same constraints and having other combinations of phase set durations may collectively have between two and nine phase set changes.

It is from a set or subset of all the possible timing plans that a timing plan may be selected on the basis of estimated EV and or count throughputs, or some other output criteria such as travel time for certain vehicles or users.

The TMS 101 may make these calculations on a constant, ongoing basis, at certain intervals, or under certain conditions, such as a case there is an increase or decrease, or a rate of increase or decrease, in EVs of greater than a threshold value in one or more phases during the time horizon TH.

In another example, the junction A2 has a two phase set cycle including the phase set A and the phase set B. Each time period may be 10 seconds. For each phase set the minimum green time is 10 seconds, the yellow time is 6 seconds, the maximum green time is 120 seconds, and the all red clearance time is 4 seconds. The time horizon TH is 600 seconds. The shortest time a phase set may be active (green, yellow and all-red time) is then 20 seconds (10+10 seconds) while the maximum active time is 130 seconds (120+10 seconds). One having ordinary skill in the art will recognize that these variables may have a wide range of adjustment and be set or adjusted based on a location, characteristics and conditions of the junction A2.

Figure 10A:
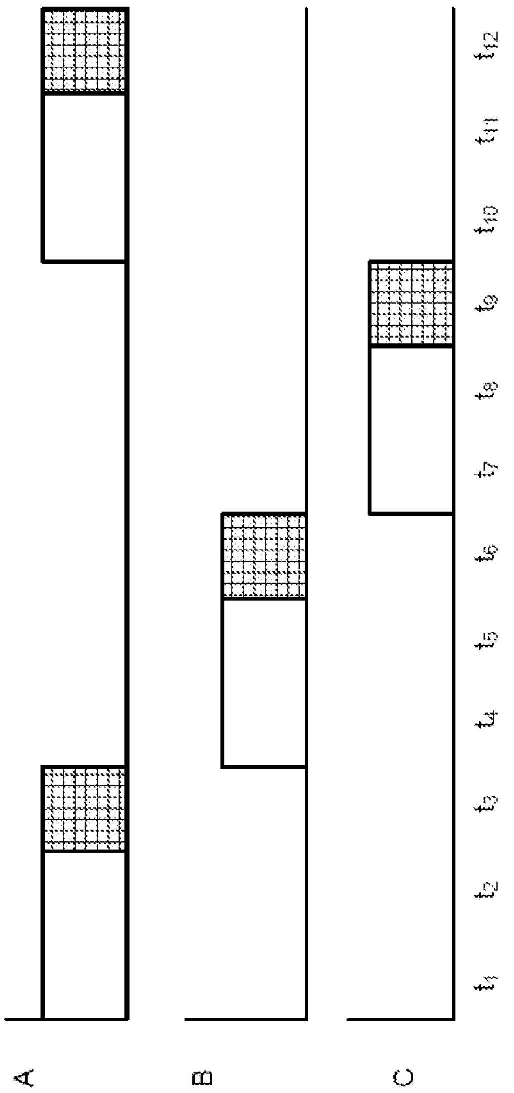
FIGS. 10A-10B each show exemplary graphs of a traffic signal status of a phase set A, a phase set B, and a phase set C at the junction A2 during a time horizon TH of at least 12 time periods t1 through t12, similar to those of FIGS. 9A-9C.
Figure 10B:
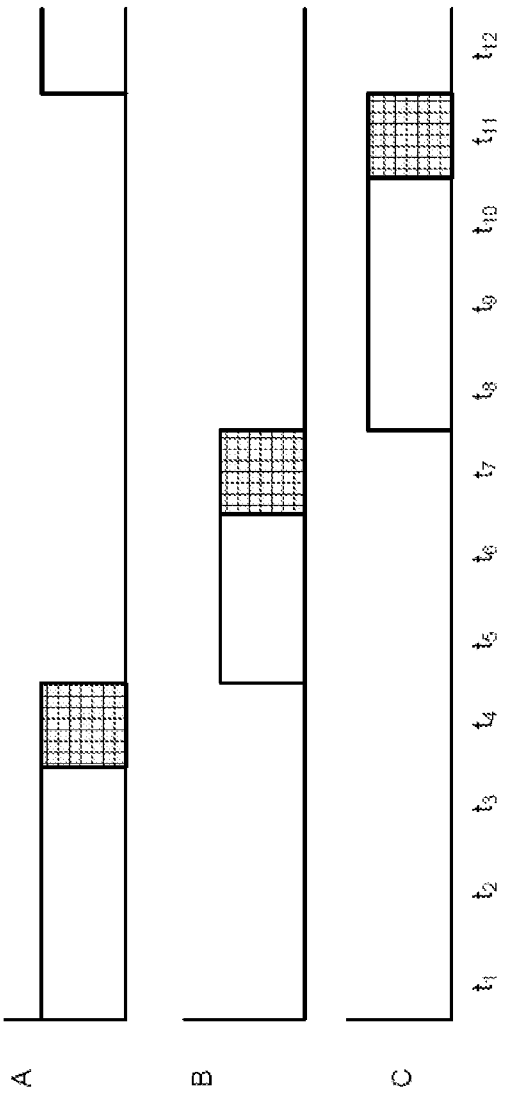

FIGS. 10A-10B each show exemplary graphs of a traffic signal status of a phase set A, a phase set B, and a phase set C at the junction A2 during a time horizon TH of at least 12 time periods t1 through t12, similar to those of FIGS. 9A-9C. However, three phase sets (sets A, B and C) are shown, alternating in their provisioning of a green traffic signal status instead of two phase sets.

In a fixed order configuration, such as a case that the phase set A is followed by the phase set B which is followed by the phase set C, before repeating the sequence, a time duration of each phase set may be varied in accordance with a minimum and/or a maximum time duration of each phase set for each cycle as described by FIGS. 9A-9C. Phase sets or cycles may be repeated as necessary such that a sum of phase set durations may be equal to at least about a time horizon TH.

For the duration of the time horizon TH, the junction A2 may be operating on three (or more) phase sets such as the phase set A (such as having phases 2 and 6), the phase set B (such as having phases 4 and 8), and the phase set C (such as having phases 1 and 5, as shown by FIG. 5A). Such may be the case when no left turns are permitted in two opposite directions approaching the junction A2 while separate, protected left turn phases concurrently forming a phase set are permitted in two other opposite directions of traffic.

The time horizon TH may have a number of time periods, depending on the duration of each time period. The signal status of the phase set A, the phase set B, and the phase set C may be selected based on an estimated optimal throughput, for example of EV or vehicle counts, for the junction A2 for the duration of the time horizon TH.

In other words, a timing plan may be selected for all or part of the time horizon TH to optimize throughput, provided all constraints are met, including the sequence or order of phase sets for each cycle during the time horizon TH. The timing plan may be selected by evaluating or estimating a probable throughput for the junction A2 from a set of possible timing plans.

In one example, the junction A2 has a three phase set cycle including the phase set A, the phase set B, and the phase set C. Each time period may be 3 seconds. For each phase set the minimum green time may be 3 seconds, the yellow time may be 3 seconds, the maximum green time may be 21 seconds, and the all red clearance time may be zero. The time horizon TH may be 60 seconds. The shortest time a phase set may be active (green and yellow time) may then be 6 seconds (3+3 seconds) while the maximum active time may be 24 seconds (21+3 seconds).

During the time horizon TH, the first, second and third phase sets operating at minimum green durations may thus collectively change between those phase sets up to nine times in between the start and end of the time horizon TH. The phase sets may collectively change at least twice while operating at maximum green durations within the same time horizon TH.

Other timing plans operating during the same time horizon TH with the same constraints and having other combinations of phase set durations may have between two and nine collective phase set changes.

It is from a set or subset of all the possible timing plans that a timing plan may be selected on the basis of estimated EV and or count throughputs, or some other output criteria such as travel time for certain vehicles or users.

The TMS 101 may make these calculations on a constant, ongoing basis, at certain intervals, or under certain conditions, as previously described.

In one case, phase set durations may be selected on the basis of a sum of EVs of a number of time periods of a phase or phase set of the junction A2 for the time horizon TH, given the known constraints, to allow the maximum traffic throughput and highest total EV to pass through the junction A2.

In another case, weightings may be assigned according to a time decay formula such that soonest time periods have a higher weighting and greater significance than later time periods. Further, confidence may have an impact, which would also weight sooner time periods more significantly than later time periods.

In another case, weightings may be assigned by sets of time periods. For example, periods t1 through a have greater weighting, then t(a+1) to b have a second, lower weighting, and then t(b+1) to tc have a lower weighting still (where a<b<c).

Figure 11A:
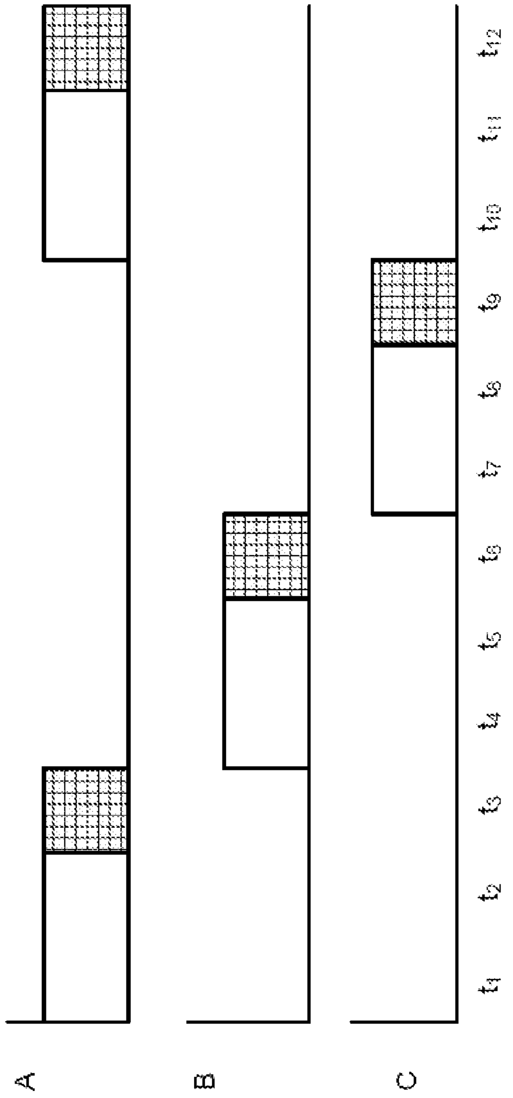
FIGS. 11A-11B each show exemplary graphs of a traffic signal status of a phase set A, a phase set B, and a phase set C at the junction A2 during a time horizon TH of at least 12 time periods t1 through t12, similar to the three phase sets of FIGS. 10A-10B.
Figure 11B:
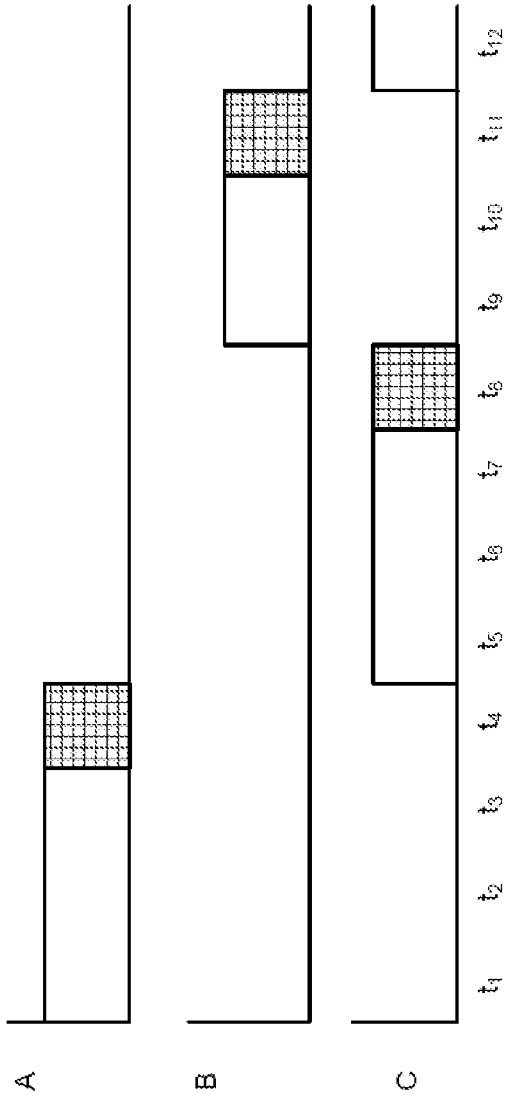

FIGS. 11A-11B each show exemplary graphs of a traffic signal status of a phase set A, a phase set B, and a phase set C at the junction A2 during a time horizon TH of at least 12 time periods t1 through t12, similar to the three phase sets of FIGS. 10A-10B. However, the phase sets (e.g. sets A, B and C) may alternate their provisioning of a green traffic signal status in a flexible order.

In a flexible order configuration of three (or more) phase sets, each phase set may be followed by any or a set of some or all of the other phase sets. A time duration of each phase set may be varied between a minimum green time and a maximum green time of the phase set, as described by FIGS. 9A-9C and 10A-10B. Phase sets and/or cycles may be repeated as necessary such that a sum of phase set durations may be equal to at least about a time horizon TH.

A sequence of phase sets in a cycle may be the phase set A followed by the phase set B and then phase set C, as in the fixed order configuration.

Alternatively, the sequence of phase sets in the cycle may be the phase set B followed by the phase set A, and then the phase set C for one cycle, and then a same or other sequence of phase sets for a subsequent cycle. Cycles may be defined as in the fixed order cases described above.

The process is similar to that of a fixed order comparison process with respect to EVs and/or counts. However, a phase set in the sequence may be omitted depending on outcomes of EV comparisons between different phases or phases sets. For example, if a first phase set in a sequence has a low (or zero) EV relative to that of a subsequent phase set then the first phase set may be omitted during a cycle, including its requisite yellow and red change time tCH.

A flexible order comparison process may operate similarly to a fixed order comparison process with an exception that one or more phase sets of a cycle may be omitted or skipped, provided more than one phase set is operated with a green signal status during the cycle.

In another case, a sequence of phase sets may have a free order, and a duration of each phase set may be variable. Cycles may be defined as in the fixed and flexible order cases described above, but may not be necessary. Phases and/or phase sets may be sequenced in any order, allowing traffic signals to be operated with maximum flexibility for matching EV or counts in each traffic phase.

The junction A2, such as one shown in FIG. 5, may be scheduled or anchored in advance to provide a green, red, flashing, or pedestrian walk or don't walk signal status for a phase or phase set during a future time span, the time span having one or more time periods.

The time span may be within a present time horizon TH or afterward. In a case the time span is fully within the present time horizon TH then the time span may have additional time before or after to complete provisioning of a phase or phase set while meeting minimum and maximum time constraints of traffic signal status.

If the time span is not fully within the present time horizon TH then at least a portion of the duration of the time span and its associated signal status may be stored in system memory until the time span is fully within the time horizon TH, and then the time span may be considered as described for a case the time span is within the present time horizon TH.

In one case, the time span duration may encompass the entirety of a phase or phase set. In another case, the entirety of the time span duration may be within a phase or phase set of longer duration. In yet another case, the time span duration may be approximately or exactly equal to a phase or phase duration. In each case, a duration of the preceding and subsequent phases or phase sets within a cycle, may be different from that of the phase or phase set during or within which the time span occurs.

Further, more than one phase or phase set and time span may be scheduled or anchored in advance. If there is a conflict in terms of direction and timing, the time span may The time span scheduled may have one or more preassigned EVs for one or more time periods within the time span. The EV may be related to anticipated arrival of one or more vehicles or users at the junction A2 during the time span in the direction of the green phase or phase set. The EVs may include a multiplier based on confidence or advance request by a vehicle or user, providing a higher probability to the vehicle or user of uninterrupted passage at the anticipated time of arrival at the junction A2. In one case the EVs for the junction A2 during one or more time periods of the future time span may be fixed at the time of scheduling. In another case the EVs for the junction A2 during one or more time periods of the future time span may change with time and/or a location of a vehicle or user after initial scheduling. In another case, the EVs for the time span may be fixed at a maximum value such as for emergency operation, road work, and special events. In another case, the time span may be flexible in duration (the number of time periods), and EVs may fluctuate such as based on a function of confidence of tETA for the user to arrive at the junction A2, the user's VSS, or the user's present group's GSS.

In one case, the time span may be shifted to among different time periods of the time horizon, including to a different cycle, if applicable, due to situations such as a periodic reevaluation of EVs, of vehicle or user VSS, or a periodic comparison of vehicle or user VSS or GSS of others, and/or other conditions.

In each case described above, certain phases or phase sets may be assigned to have a specific status, such as a green or walk signal, in advance (scheduled) and the duration of those phases may be fixed or variable for some time span, such as for accommodating anticipated traffic during some portion of a present time horizon. Such phase assignments may have constraints around which EV comparisons are performed.

For example, a phase may be adjusted by extending or curtailing its duration based on estimated or anticipated EVs with the goal of increasing throughput. In another case, a phase may be anchored for a time span on a first-come, first serve basis, based on highest VSS or GSS, an emissions metric, to minimize total travel time, a junction weighting (e.g. prioritizing one direction approaching a junction based on condition such as topography, weather, work zone status, etc.), or an emergency usage.

In other words, phase scheduling may be prioritizing known EV(s) for certain locations and/or for certain users during certain time periods or time spans, and then filling in other traffic phases or phase sets around that schedule based on available information. The VSS of a known user may increase or decrease based, at least in part, on the user's performance with respect to predictability, such as the user's record of arrival at one or more locations (such as the junction A2) within a time period consistent with the EVs and time periods attributable to the user.

Further, an objective may not be to maximize throughput or optimize a result for the junction A2 itself. Rather, the objective may be to maximize throughput or optimize the result for more than one junction, such as across a grid of junctions or along a corridor having multiple junctions, for which there may be a variety of alternate processes the TMS 101 may use.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

What is claimed:

1. A system for adaptively controlling at least one traffic control device, the system comprising:

circuitry for at least one of a sending and receiving of data;

a processor for processing data; and a memory for storing data, wherein the circuitry is configured to receive data from external sources and devices, to operate a traffic control algorithm for processing data for at least one iteration, and to transmit the processed data to the at least one traffic control device, wherein the traffic control algorithm includes at least one of the steps of:

calculating an expected value of the at least one user and direction of travel relative to at least one subsequent location;

estimating a probability the at least one user may arrive at the at least one subsequent location during at least one time period within a time horizon;

summing the expected values of the at least one user to determine a total expected value of at least one direction of the at least one subsequent location during the at least one time period;

comparing the summed expected value of each direction of the at least one subsequent location to determine a direction having a greatest sum of expected value during a period of the at least one time period; and selecting an action to be performed by the traffic control device during the at least one time period in response to the comparing step.

2. A method for adaptively controlling at least one traffic control device, the method comprising the steps of:

receiving a traffic detection event of at least one user at least one first location;

calculating an expected value of the at least one user and direction of travel relative to at least one subsequent location;

estimating a probability the at least one user may arrive at the at least one subsequent location during at least one time period within a time horizon;

summing the expected values of the at least one user to determine a total expected value of at least one direction of the at least one subsequent location during the at least one time period;

comparing the summed expected value of each direction of the at least one subsequent location to determine a direction having a greatest sum of expected value during a period of the at least one time period;

selecting an action to be performed by the traffic control device during the at least one time period in response to the comparing step; and transmitting the request to at least one traffic control device.

* * * * *